(12) United States Patent
Youn et al.

(10) Patent No.: US 11,383,387 B2
(45) Date of Patent: Jul. 12, 2022

(54) ROBOT HAVING A HEAD UNIT AND A DISPLAY UNIT

(71) Applicant: LG ELECTRONICS INC., Seoul (KR)

(72) Inventors: Jekwang Youn, Seoul (KR); Yongbeom Ma, Seoul (KR); Hyunchul Park, Seoul (KR); Younghwan Lee, Seoul (KR); Dongkyu Choi, Seoul (KR); Daeyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 397 days.

(21) Appl. No.: 16/577,669

(22) Filed: Sep. 20, 2019

(65) Prior Publication Data
US 2020/0009740 A1 Jan. 9, 2020

Related U.S. Application Data

(63) Continuation of application No. PCT/KR2019/002732, filed on Mar. 8, 2019.

(51) Int. Cl.
*B25J 11/00* (2006.01)
*B25J 9/00* (2006.01)
*B25J 5/00* (2006.01)

(52) U.S. Cl.
CPC ......... *B25J 11/0015* (2013.01); *B25J 9/0009* (2013.01); *B25J 11/003* (2013.01); *B25J 5/007* (2013.01)

(58) Field of Classification Search
CPC ... B25J 11/0005; B25J 11/0015; B25J 11/003; B25J 9/1689; B25J 9/1697; B25J 9/0009;
(Continued)

(56) References Cited

U.S. PATENT DOCUMENTS 7,103,449 B2 * 9/2006 Woo ..................... G05D 1/0255
700/251
8,781,164 B2 * 7/2014 Lee ..................... G05D 1/0246
701/28
(Continued)

FOREIGN PATENT DOCUMENTS

CN 206764796 12/2017
CN 108488562 9/2018
(Continued)

OTHER PUBLICATIONS

International Search Report dated Dec. 10, 2019 issued in Application No. PCT/KR2019/002732.

*Primary Examiner* — Jake Cook
*Assistant Examiner* — T. Scott Fix
(74) *Attorney, Agent, or Firm* — KED & Associates LLP

(57) ABSTRACT

A robot according to the present disclosure may include: a casing that has an internal space; a head unit that protrudes upward from the casing and has a first display; a display unit that is disposed ahead of the casing and has a second display; an ascending and descending motor that is disposed in the casing; an ascending and descending plate that ascends and descends between a first position and a second position higher than the first position by power of the ascending and descending motor; a contact bar that has an upper end connected to the head unit and a lower end being in contact with the ascending and descending plate; a fixing plate that is positioned between the ascending and descending plate and the head unit and has an opening through which the contact bar passes; and a link that connects the ascending and descending plate and the fixing plate to the display unit.

20 Claims, 25 Drawing Sheets

(58) Field of Classification Search
CPC ......... B25J 5/005; B25J 5/007; Y10S 901/01; Y10S 901/08; G05D 2201/0211; G05D 2201/0206; G05D 2201/0207; A63H 3/365; A63H 3/20; A63H 3/04; A63H 3/001; A63H 3/00; A63H 13/005; A63H 13/00
USPC .................................................. 74/490.05
See application file for complete search history.

(56) References Cited

U.S. PATENT DOCUMENTS

| | | | | |
|---|---|---|---|---|
| 9,535,421 | B1* | 1/2017 | Canoso | G05D 1/0248 |
| 2008/0029536 | A1* | 2/2008 | Wang | B25J 19/022 |
| | | | | 221/210 |
| 2009/0177323 | A1* | 7/2009 | Ziegler | G05D 1/0274 |
| | | | | 901/1 |
| 2011/0245973 | A1* | 10/2011 | Wang | G05D 1/0272 |
| | | | | 901/47 |
| 2011/0288684 | A1* | 11/2011 | Farlow | G05D 1/0038 |
| | | | | 901/1 |
| 2012/0061155 | A1* | 3/2012 | Berger | B25J 19/0016 |
| | | | | 180/21 |
| 2012/0071155 | A1* | 3/2012 | Carter | H04M 1/72469 |
| | | | | 455/422.1 |
| 2012/0209433 | A1* | 8/2012 | Paz Rodriguez | B25J 11/0005 |
| | | | | 901/1 |

FOREIGN PATENT DOCUMENTS

| | | |
|---|---|---|
| JP | 2016-101441 | 6/2016 |
| KR | 10-2011-0053724 | 5/2011 |
| KR | 10-2019-0003121 | 1/2019 |

* cited by examiner

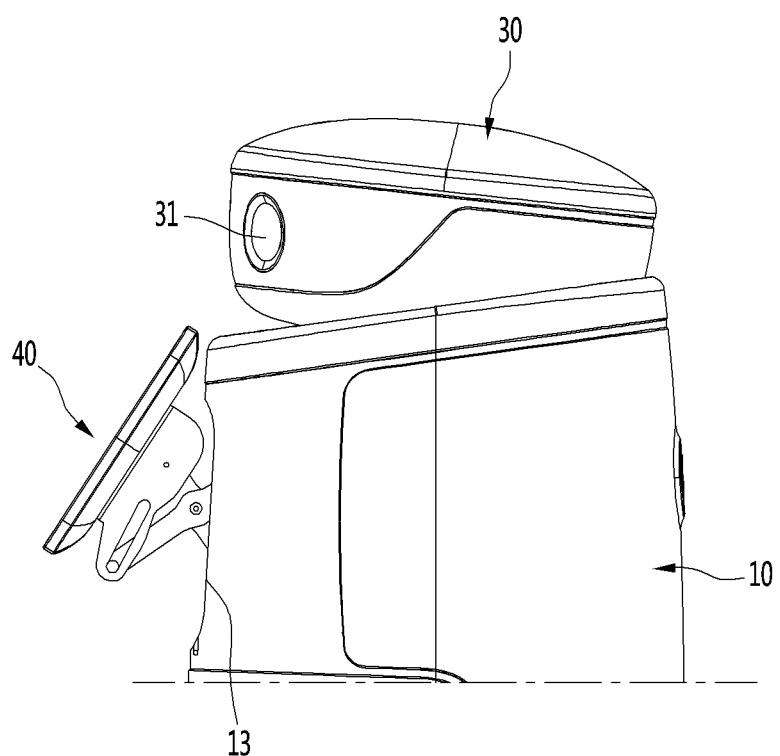

US 11,383,387 B2

ROBOT HAVING A HEAD UNIT AND A DISPLAY UNIT

CROSS-REFERENCE TO RELATED APPLICATIONS

The present application is a continuation application of PCT/KR2019/002732 (filed on 2019 Mar. 8), which is hereby incorporated by reference in its entirety.

BACKGROUND

The present disclosure relates to a robot, and more particularly, to a robot having a head.

Robots have been developed for industrial use in order to be in charge of part of factory automation. In recent years, applications of the robot have been expanded such that robots that may be used in daily life as well as medical robots and aerospace robots have been developed.

These robots that may be used in the daily life provide specific services (e.g., shopping, serving, conversation, cleaning, etc.) in response to a user command. In addition, the robots that may be used in the daily life include a display to display information, videos, or images related to the services.

In addition, specific robots that may be used in the daily life include a head and a body to resemble a human body to give a user an affinity. In this case, the head may be provided with a head display for indicating a facial expression and the like of the robot. Further, the body may be provided with a body display for displaying the information, videos, or images related to the service.

However, the conventional robots have a problem that only the head display is rotated or tilted, and the body display is fixed and does not move.

SUMMARY

An object of the present disclosure is to provide a robot in which a head unit and a display unit can be tilted.

Another object of the present disclosure is to provide a robot in which a head unit and a display unit are simultaneously tilted by a single motor.

In a robot according to an embodiment of the present disclosure, a contact bar connected to a head unit and a link connected to a display unit can be connected to an ascending and descending plate. Accordingly, the head unit and the display unit are simultaneously tilted by ascending and descending of the ascending and descending plate.

In more detail, a robot according to the present disclosure may include: a casing that has an internal space; a head unit that protrudes upward from the casing and has a first display; a display unit that is disposed ahead of the casing and has a second display; an ascending and descending motor that is disposed in the casing; an ascending and descending plate that ascends and descends between a first position and a second position higher than the first position by power of the ascending and descending motor; a contact bar that has an upper end connected to the head unit and a lower end being in contact with the ascending and descending plate; a fixing plate that is positioned between the ascending and descending plate and the head unit and has an opening through which the contact bar passes; and a link that connects the ascending and descending plate and the fixing plate to the display unit.

The contact bar may be formed to increase in height in a forward direction and to bend so that a forward section is approximately vertical.

When the ascending and descending plate is at the first position, the first display may be hidden in the casing, and when the ascending and descending plate is at the second position, the first display may protrude upward from the casing.

When the ascending and descending plate is at the first position, the display unit may be in contact with the outer surface of the casing, and when the ascending and descending plate ascends to the second position, the display unit may be spaced apart from the outer surface of the casing.

When the ascending and descending plate ascends, the direction that the first display faces and the direction that the second display faces may be tilted upward.

When the ascending and descending plate ascends from the first position to the second position, the angular change amount of the direction that the first display faces may be different from the angular change amount of the direction that the second display faces.

The robot may further include a power transmitting part that transmits rotational force of the ascending and descending motor to the ascending and descending plate. The power transmitting part may include: a first arm that is connected to the ascending and descending motor; and a second arm that is rotatably connected to the first arm and is rotatably connected to the lower side of the ascending and descending plate.

The robot may further include at least one guide bar that is vertically elongated, is connected to the fixing plate, and guides ascending and descending of the ascending and descending plate.

The robot may further include a head receiving cover that is disposed over the fixing plate, has a through-hole through which the contact bar passes, and receives at least a portion of the head.

A link-through hole through which the link passes may be formed through the casing.

The link may include: a first link bar that is rotatably connected to a first connector disposed on the ascending and descending plate; and a second link bar that is rotatably connected to a second connector disposed on the fixing plate and forms a joint while crossing the first link bar.

The display unit may include: a rear cover that covers the second display from behind; and a link connector that is fastened to the rear surface of the rear cover and to which the link is connected.

The link may include: a first link bar that is rotatably connected to the link connector; and a second link bar that forms a joint while crossing the first link bar and is connected to be movable along an oblong hole formed in the link connector.

The robot may further include a guide body that is fastened to the upper side of the fixing plate and guides movement of the contact bar.

A guide groove that is elongated in the longitudinal direction of the contact bar may be formed at the contact bar, and a guide rib that is fitted in the guide groove may be formed at the guide body.

The robot may further include: a base that is disposed under the casing; a column that protrudes upward into the casing from the base; an inner frame that is fastened to the column to be able to tilt; and a tilting motor that tilts the inner frame with respect to the column. The casing and the inner frame may be tilted together with respect to the base A tilting axis of the inner frame may be spaced apart from the upper side of the tilting motor.

The robot may further include a lever that transmits rotational force of the tilting motor to the inner frame. The lever may include: a motor connecting part that is connected to the tilting motor; a lever body that extends from the motor connecting part in a direction perpendicular to the rotational axis of the tilting motor; and an oblong hole inserting part that protrudes from the lever body in a direction parallel to the rotational axis of the tilting motor and is movably inserted a guide oblong hole formed in the inner frame.

A depression may be formed to be recessed downward on the top surface of the base, and the casing is positioned over the depression.

The fixing plate and the ascending and descending motor may be connected to and supported by the inner frame.

BRIEF DESCRIPTION OF THE DRAWINGS

FIGS. 3A to 3C are schematic diagrams illustrating a head unit and a display unit of a robot according to an embodiment of the present disclosure that are tilting relative to a casing.

DESCRIPTION OF EXEMPLARY EMBODIMENTS

Hereinafter, specific embodiments of the present disclosure will be described in detail with reference to drawings.

Figure 1:
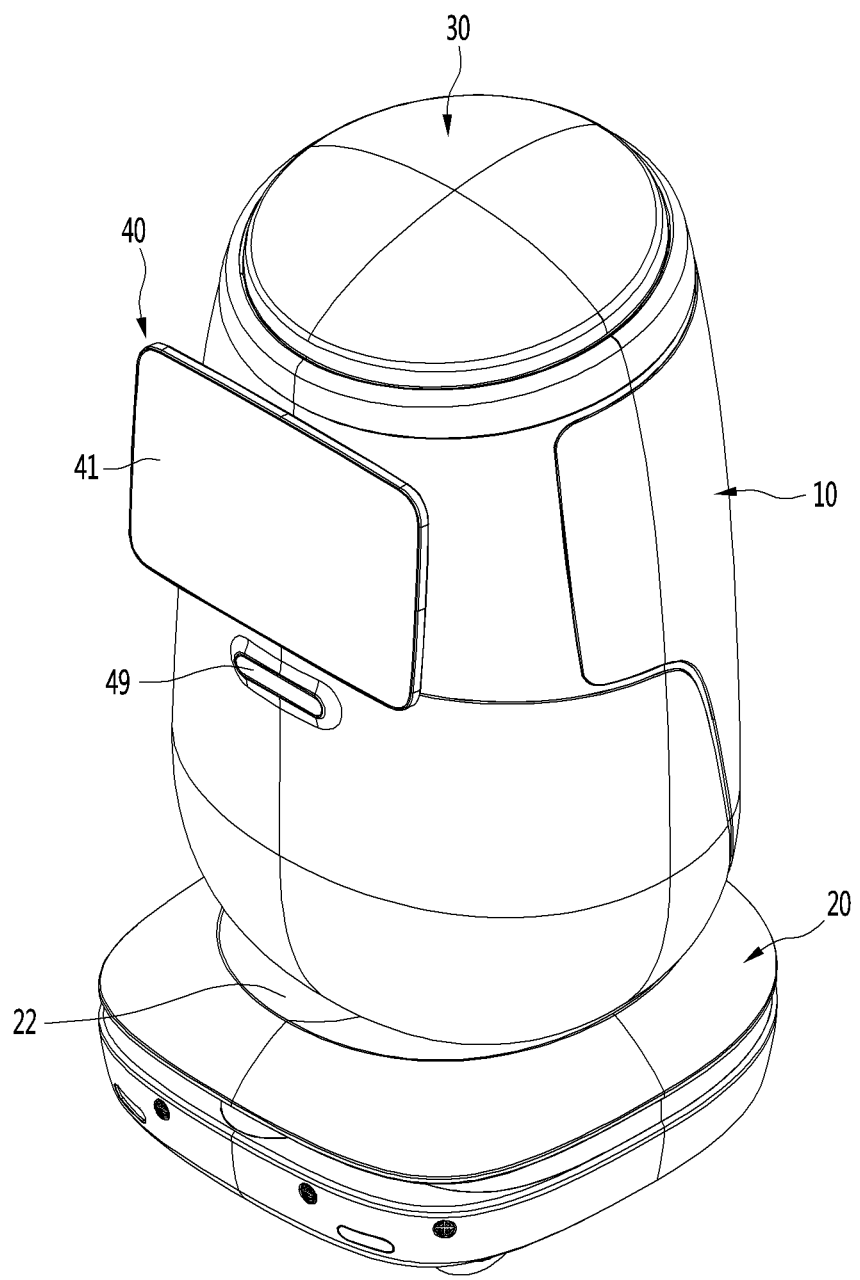
FIG. 1 is a perspective view of a robot according to an embodiment of the present disclosure.
Figure 2:
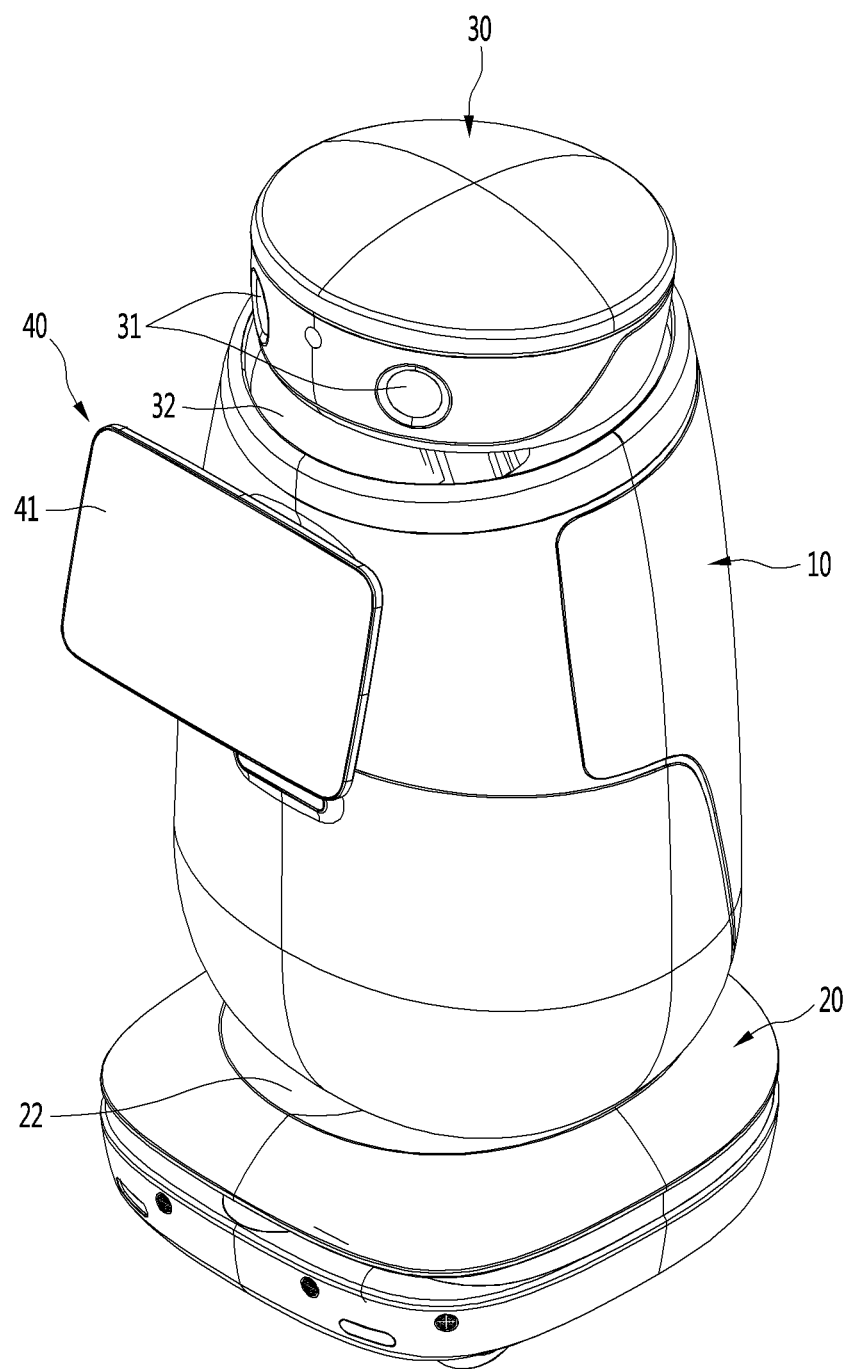
FIG. 2 illustrates a head unit and a display unit of the robot illustrated in FIG. 1 in a state of being tilted upward.

FIG. 1 is a perspective view of a robot according to an embodiment of the present disclosure. Further, FIG. 2 illustrates a head unit and a display unit of the robot illustrated in FIG. 1 in a state of being tilted upward.

A robot according to an embodiment of the present disclosure may include a casing 10, a head unit 30, and a display unit 40.

The casing 10 may form an outer surface of the robot. The casing 10 may have a substantially hollow cylindrical shape. The casing 10 preferably has a streamlined body.

The casing 10 may have an internal space defined therein. A top of the casing 10 may be opened.

A sensor device 49 may be provided on a front face of the casing 10. The sensor device 49 may include at least one of a depth camera and a ridar.

The head unit 30 may protrude upwardly from the casing 10.

The head unit 30 may include a first display 31. The first display 31 may be referred to as a head display. The first display 31 may be directed forward.

The head unit 30 may be arranged to be vertically tiltable. More specifically, the head unit 30 may be tilted upward while being ascended, or tilted downward while being descended.

When the head unit 30 is tilted downward, at least a portion of the head unit 30 may be received into the casing 10. Further, the first display 31 may be hidden in the casing 10.

When the head unit 30 is tilted upward, at least a portion of the head unit 30 may protrude upwardly from the casing 10. Further, the first display 31 may protrude upwardly from the casing 10.

When the head unit 30 is tilted upward, a facing direction of the first display 31 may be tilted upward. When the head unit 30 is tilted downward, a facing direction of the first display 31 may be tilted downward.

The display unit 40 may be disposed in front of the casing 10.

The display unit 40 may include a second display 41. The second display 41 may be referred to as a main display. The second display 41 may be directed forward.

The display unit 40 may be arranged to be vertically tiltable. More specifically, the display unit 40 may be tilted upward while moving forward, or may be tilted downward while moving backward.

When the display unit 40 is tilted downward, a rear face of the display unit may be in contact with or adjacent to the casing 10. When the display unit 40 is tilted upward, the rear face of the display unit 40 may be spaced apart from the casing 10.

When the display unit 40 is tilted upward, a facing direction of the second display 41 may be tilted upward. When the display unit 40 is tilted downward, the facing direction of the second display 41 may be tilted downward.

The robot according to an embodiment of the present disclosure may include a head receiving cover 32.

The head receiving cover 32 may cover the open top of the casing 10. The head receiving cover 32 may be disposed on a bottom face of the head unit 30.

The head receiving cover 32 may be depressed downwardly. At least a portion of the head unit 30 may be received in the head receiving cover 32.

The head receiving cover 32 may prevent foreign matter or the like from entering the casing 10 through a space between the casing 10 and the head unit 30 when the head unit 30 is tilted upward.

In this connection, the robot according to an embodiment of the present disclosure may include a base 20.

The base 20 may be disposed on a bottom face of the casing 10. A size of the base 20 in a horizontal direction may be greater than a size of the casing 10 in a horizontal direction. A height of the base 20 may be smaller than a height of the casing.

The base 20 may have a depression 22 defined downwardly in top face of the base 20. The casing 10 may be positioned in the depression 22.

Figure 6:
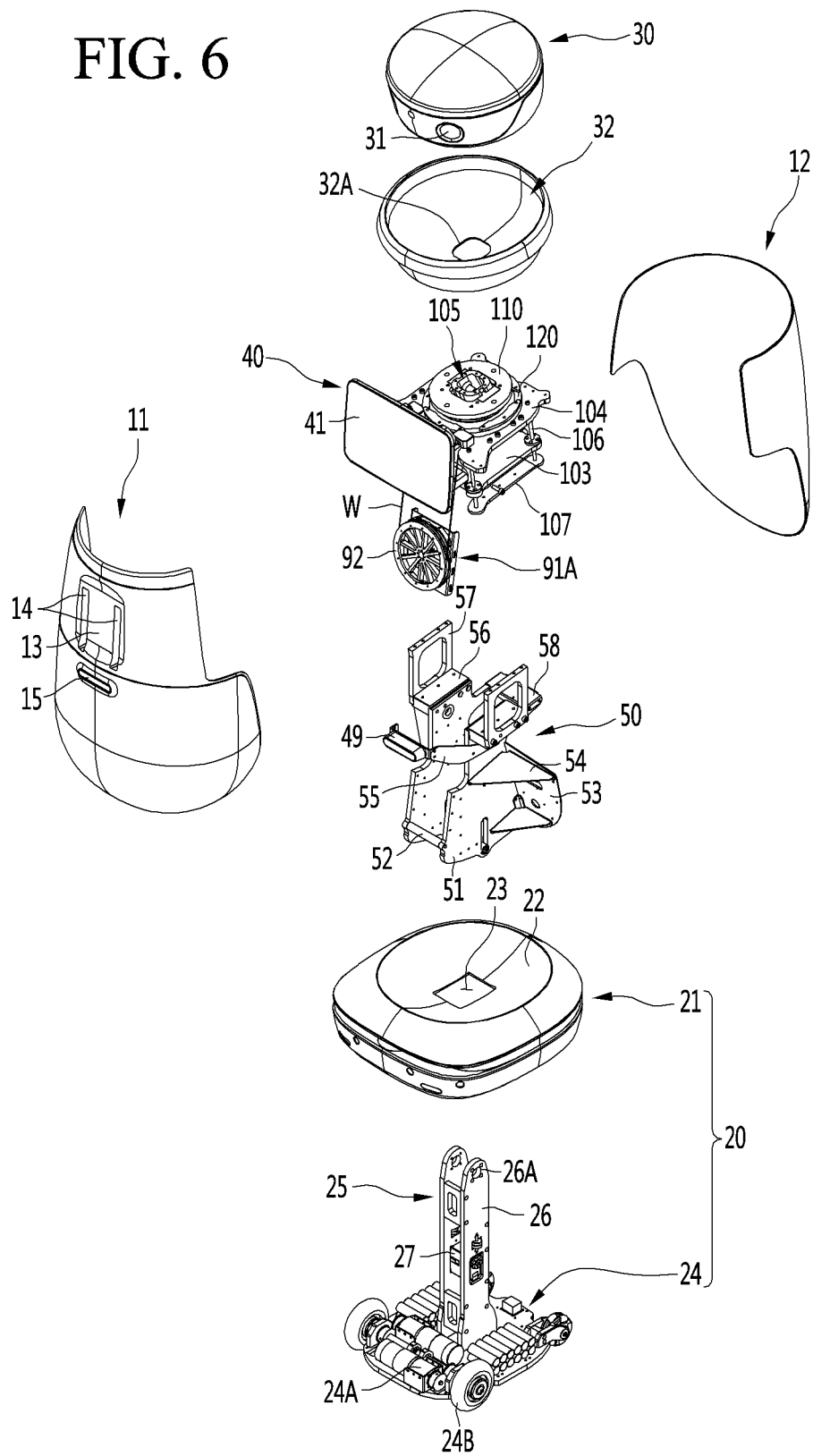
FIG. 6 is an exploded perspective view of a robot according to an embodiment of the present disclosure.

The base 20 may be provided with a vehicle 24A and 24B (see FIG. 6). The vehicle 24A and 24B may drive the robot. In addition, the base 20 may be provided with at least one sensor for sensing surrounding environment of the robot. In one example, the base 20 may be provided with a plurality of ultrasonic sensors.

Figure 3A:
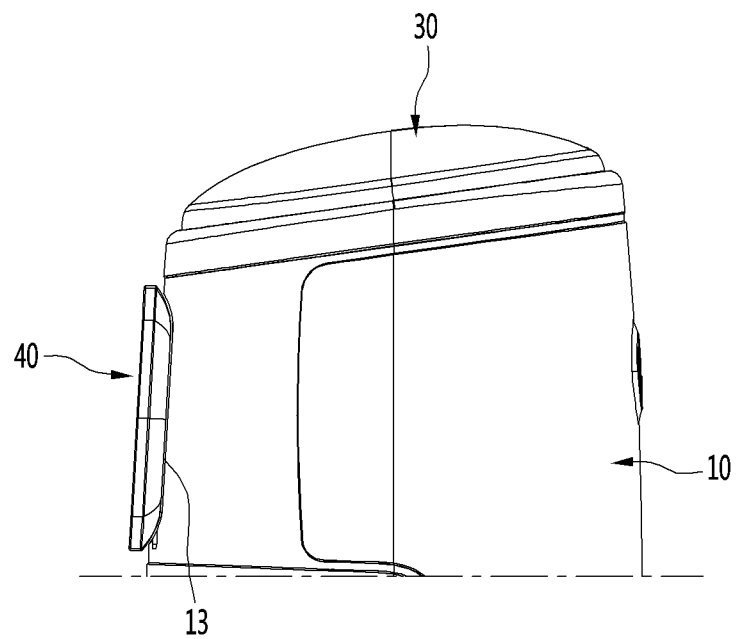
Figure 3B:
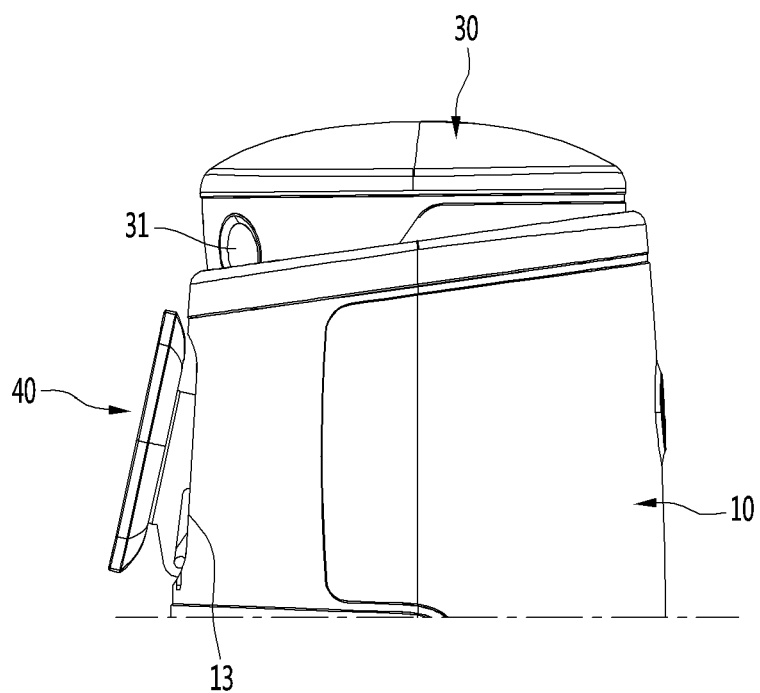

FIGS. 3A to 3C are schematic diagrams illustrating a head unit and a display unit of a robot according to an embodiment of the present disclosure that are tilting relative to a casing.

The robot according to an embodiment of the present disclosure may enter either an inactive mode, a stand-by mode, or an active mode based on a command of a user or a predetermined condition. The inactive mode may include a case in which the robot is in an off state.

The head unit 30 and the display unit 40 may be gradually tilted upward as the robot, from the inactive mode, enter the stand-by mode and the active mode.

More specifically, when the robot is in the inactive mode, at least a portion of the head unit 30 may be received in the casing 10, as shown in FIG. 3A. In this case, the first display 31 of the head unit 30 may be hidden in the casing 10. This may allow the first display 31 to be safely protected, and prevent unnecessary power consumption.

In addition, when the robot is in the inactive mode, the rear face of the display unit 40 may be in contact with or adjacent to the casing 10. More specifically, the display unit 40 may be seated on a unit seating part 13. A portion of the front face of the casing 10 may be depressed rearwardly to define the unit seating part 13.

When the robot is in the stand-by mode, a portion of the head unit 30 may protrude upwardly from the casing 10, as shown in FIG. 3B. In this case, a portion of the first display 31 of the head unit 30 may protrude upwardly from the casing 10, while the other portion thereof may be hidden in the casing 10.

Further, when the robot is in the stand-by mode, the rear face of the display unit 40 may be spaced apart from the casing 10. More specifically, the display unit 40 may be spaced apart from the unit seating part 13.

When the robot is in the active mode, at least a portion of the head unit 30 may protrude upwardly from the casing 10, as shown in FIG. 3C. In this case, the first display 31 of the head unit 30 may protrude upwardly from the casing 10. This allows the user to intuitively recognize that the robot is in the active mode.

Further, when the robot is in the active mode, the rear face of the display unit 40 may be further away from the casing 10. More specifically, the display unit 40 may be further away from the unit seating part 13.

Accordingly, the user may view the head unit 30 and the display unit 40 and recognize the mode of the robot.

Figure 4A:
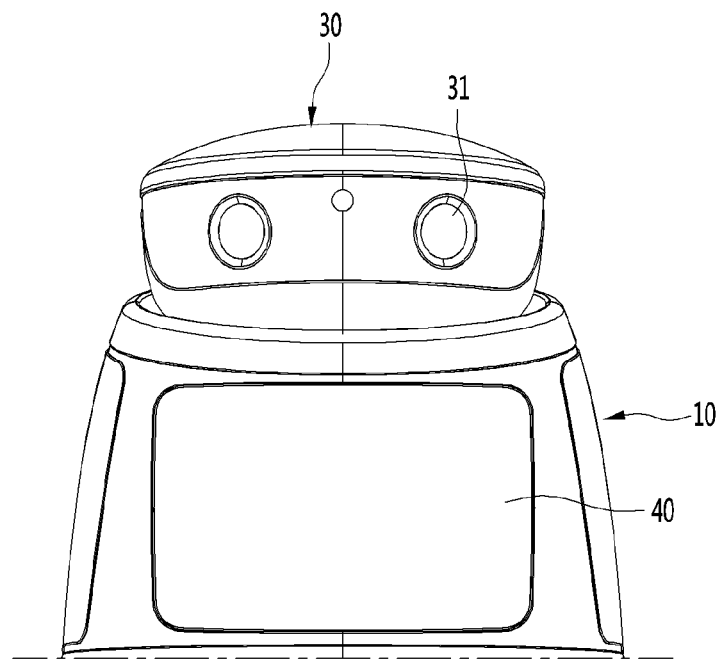
FIGS. 4A to 4C are schematic diagrams illustrating a head unit of a robot according to an embodiment of the present disclosure that is rotating relative to a casing.
Figure 4B:
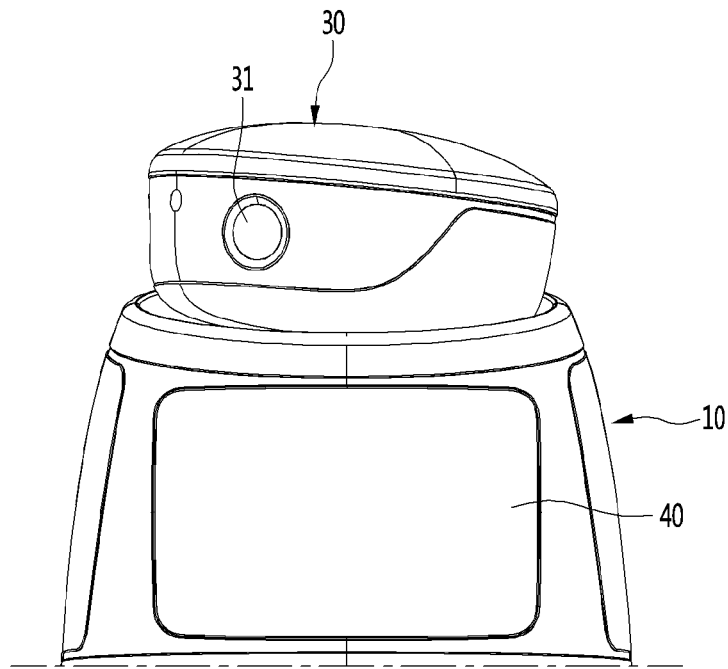
Figure 4C:
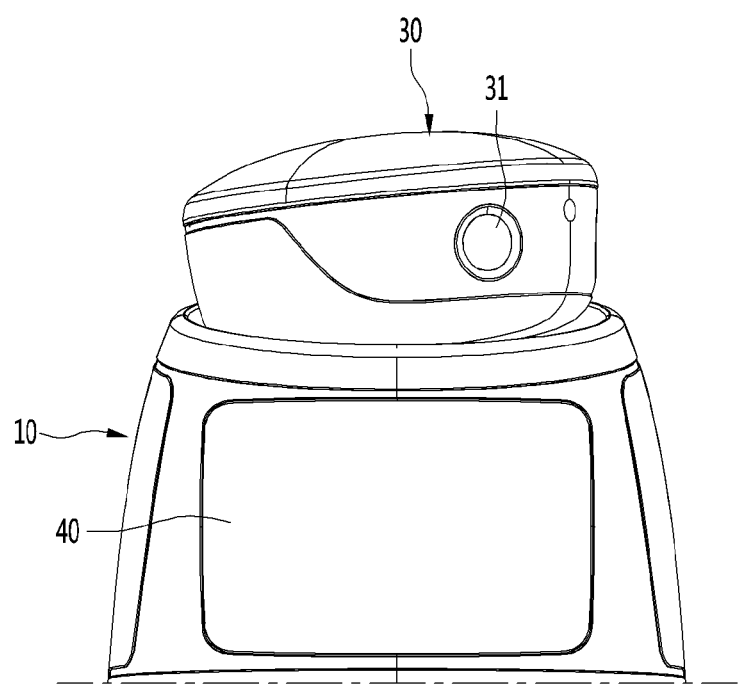

FIGS. 4A to 4C are schematic diagrams illustrating a head unit of a robot according to an embodiment of the present disclosure that is rotating relative to a casing.

The head unit 30 may rotate left and right relative to the casing 10.

FIG. 4A illustrates the head unit 30 facing forward. Further, FIG. 4B illustrates the head unit 30 rotated in one direction. Further, FIG. 4C illustrates the head unit 30 rotated in the other direction.

When the head unit 30 rotates while in a state of being tilted upward, the first display 31 may be kept protruded upward from the casing 10 without being hidden in the casing 10. That is, even though the head unit 30 rotates, a facing direction of the first display 31 may maintain a direction tilted upwardly relative to a horizontal line.

Thereby, the head unit 30 may operate naturally as if a person turns a head thereof. Further, the head unit 30 may rotate while the first display 31 continues to gaze at a face of the user. Therefore, the user may feel affinity with the robot.

Figure 5A:
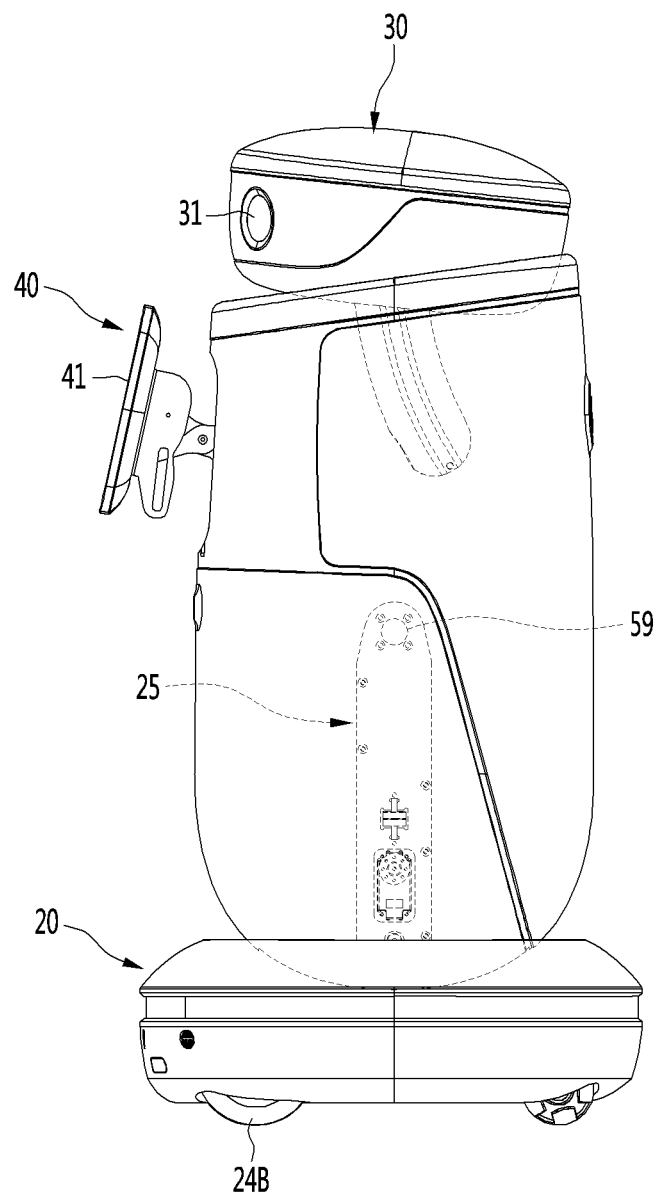
FIGS. 5A to 5C are schematic diagrams illustrating a casing of a robot according to an embodiment of the present disclosure that is tilting relative to a base.
Figure 5B:
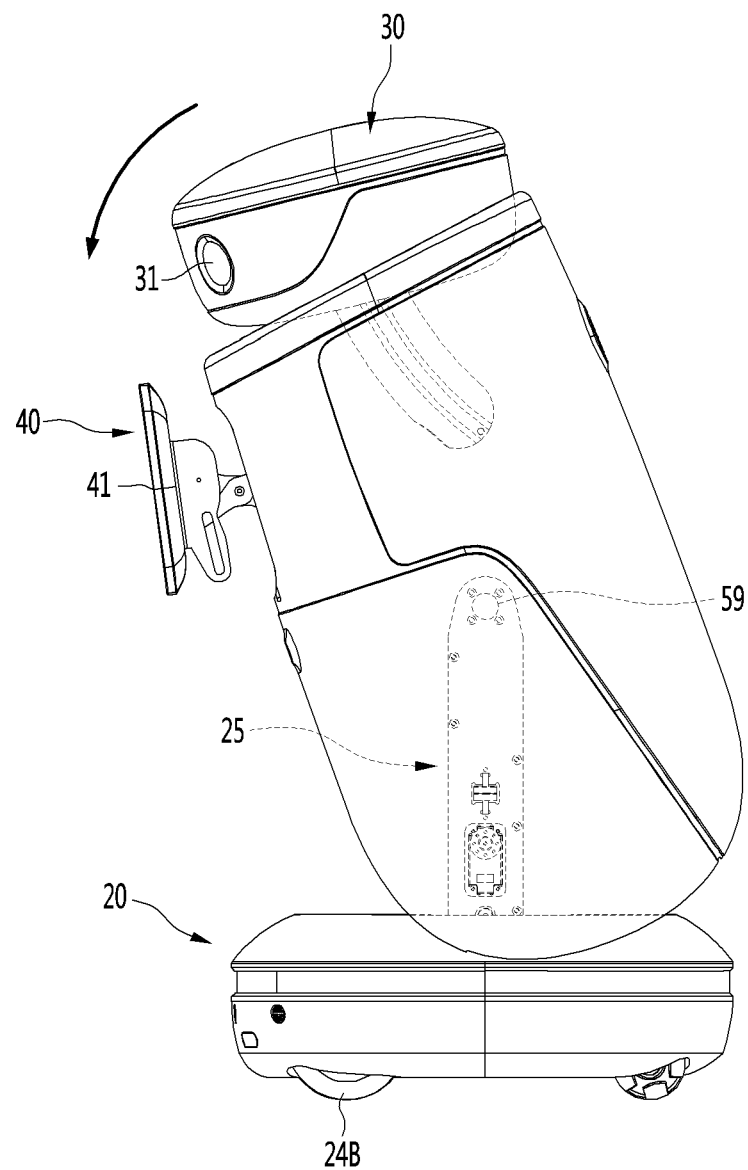
Figure 5C:
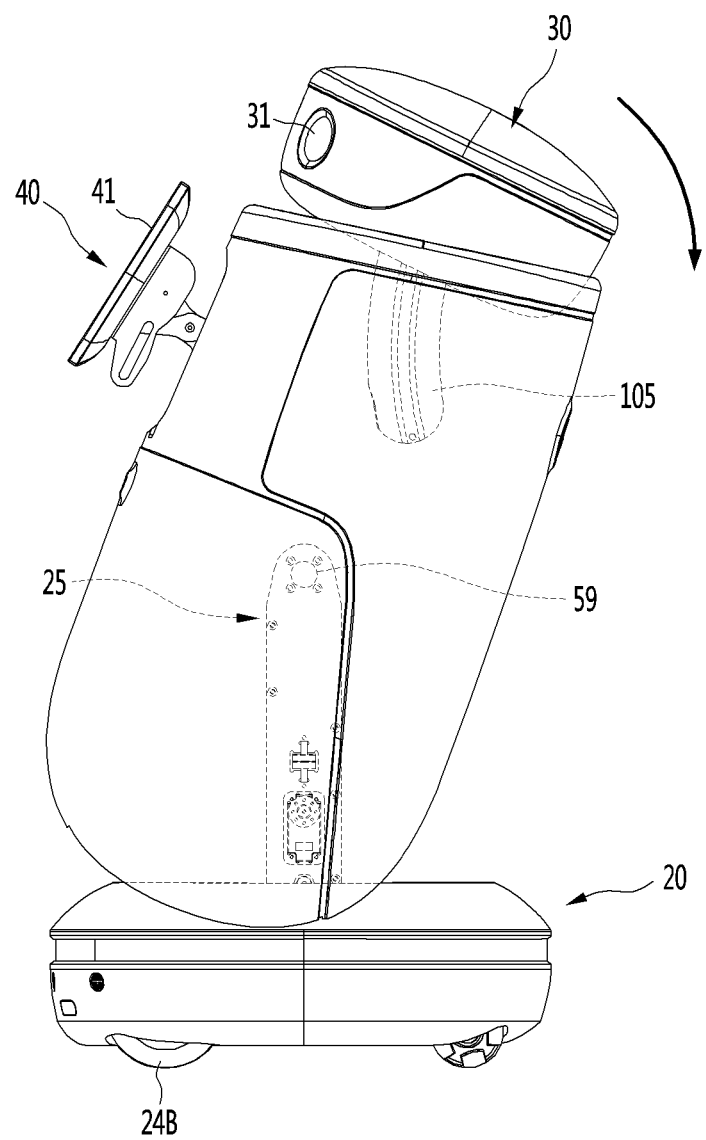

FIGS. 5A to 5C are schematic diagrams illustrating a casing of a robot according to an embodiment of the present disclosure that is tilting relative to a base.

The casing 10 may be tilted back and forth relative to the base 20. Further, the head unit 30 and the display unit 40 may be tilted together with the casing 10. Therefore, angular ranges that the head unit 30 and the display unit 40 may face may become larger.

FIG. 5A illustrates the casing 10 that is not tilted. Further, FIG. 5B illustrates the casing 10 tilted forwardly. Further, FIG. 5C illustrates the casing 10 tilted rearwardly.

More specifically, the robot may include a column 25 protruding upwardly from the base 20. A tilting shaft 59 may be connected to the column 25. The casing 10 may be tilted about the column 25.

The column 25 may protrude from the base 20 into the casing 10.

The tilting shaft 59 may be connected to an upper portion of the column 25. The tilting shaft 59 may extend in a right and left direction.

Thereby, various operations based on the travel of the robot may be realized.

In one example, when the robot advances, the casing 10 may be tilted forwardly. As the robot advances faster, the casing 10 may be gradually tilted further forwardly. On the other hand, when the robot backs, the casing 10 may be tilted rearwardly. As the robot backs faster, the casing 10 may be gradually tilted further rearwardly.

In another example, the robot may travel while tilting the casing 10 back and forth at regular intervals. That is, the robot may travel with the casing 10 swinging back and forth relative to the base 20.

Figure 7:
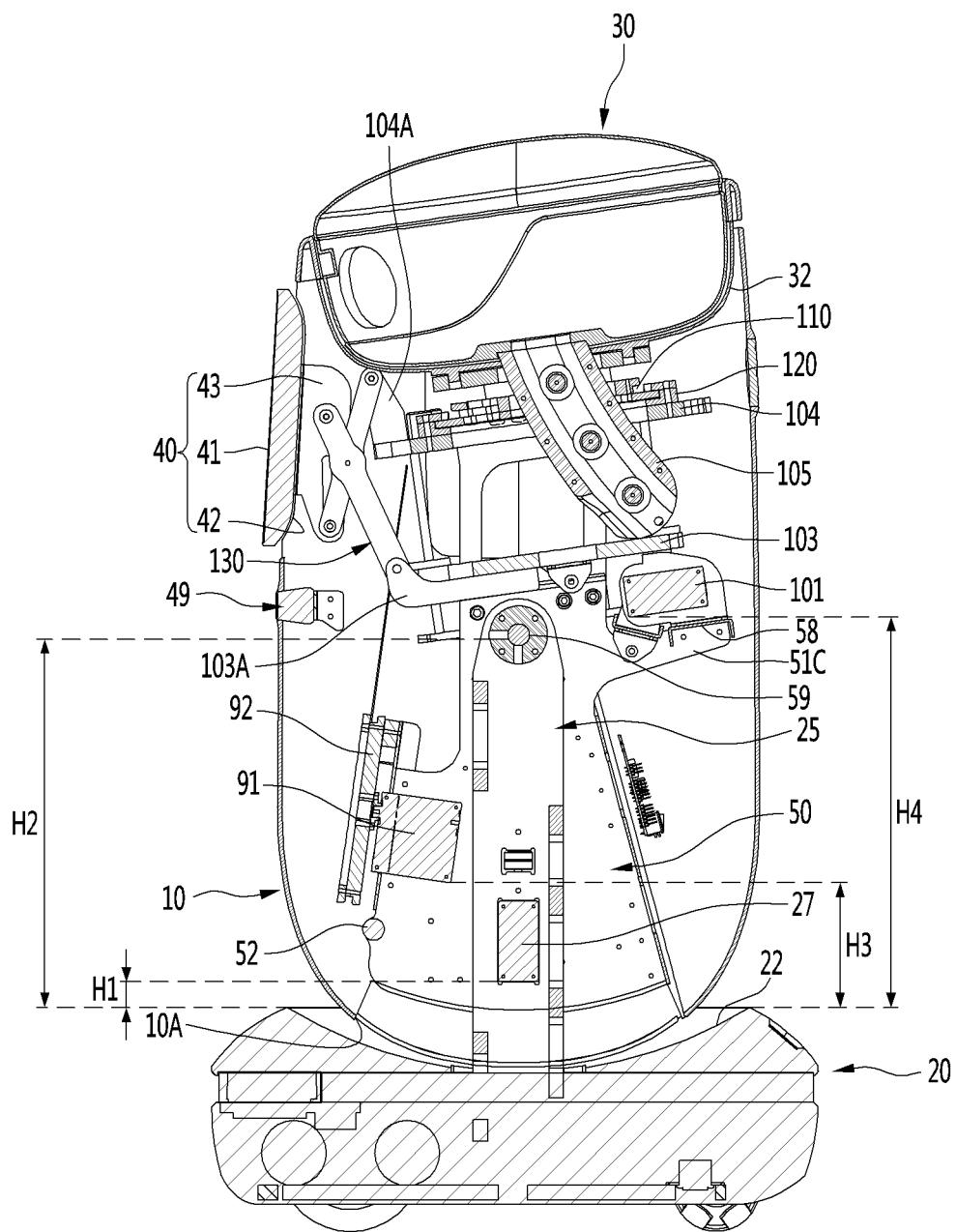
FIG. 7 is a cross-sectional view of interior of a robot according to an embodiment of the present disclosure.
Figure 8:
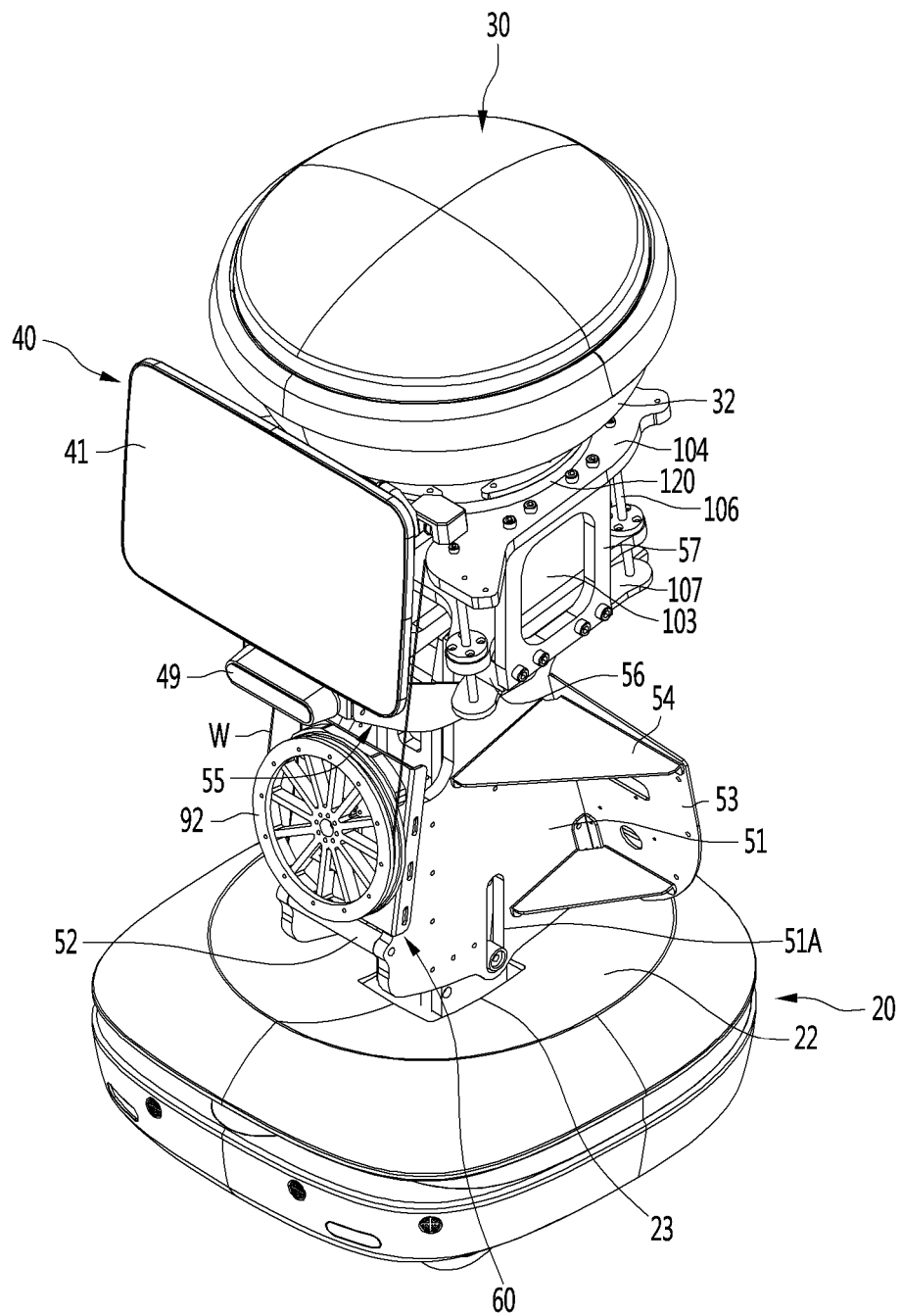
FIG. 8 is a perspective view illustrating a state in which a casing of a robot according to an embodiment of the present disclosure is removed.
Figure 9:
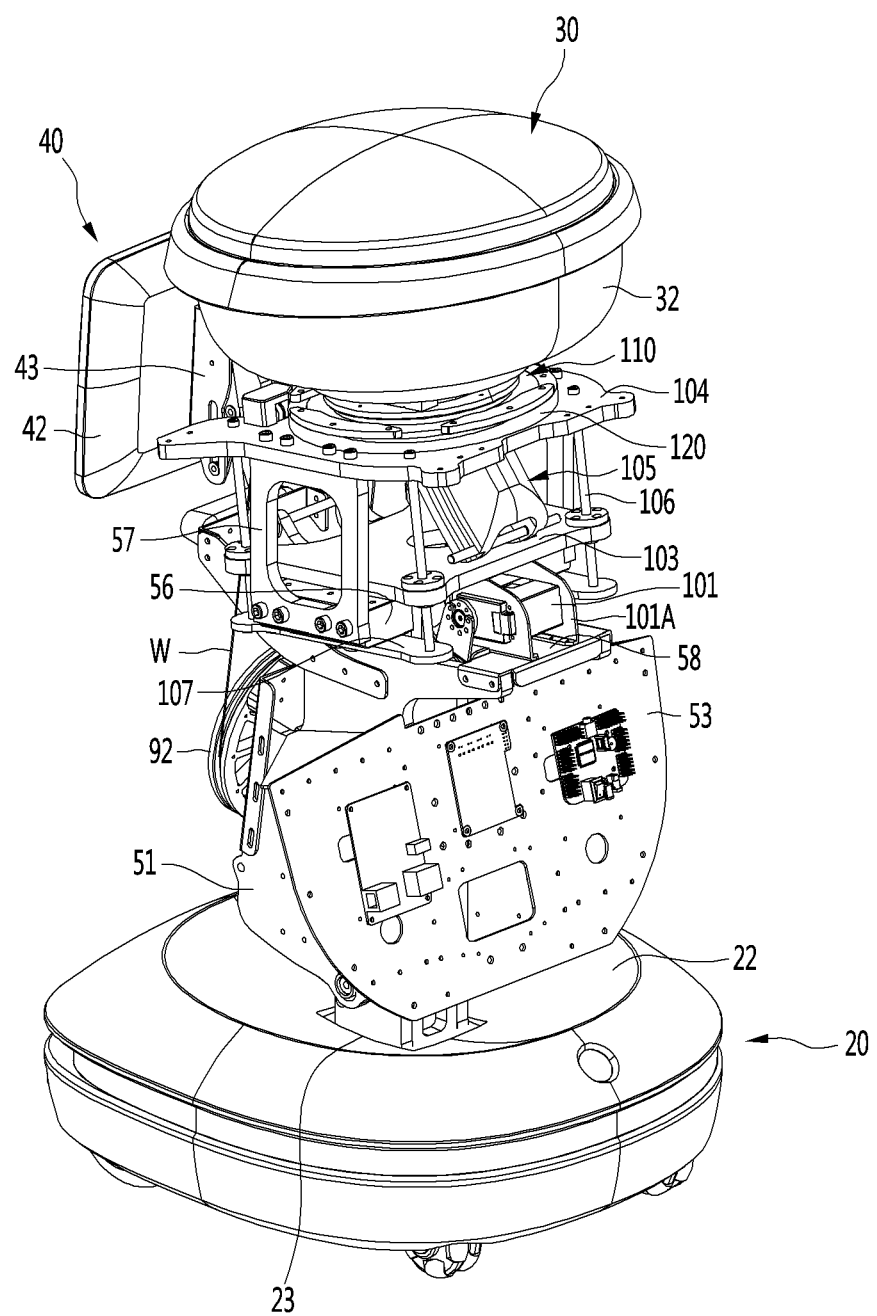
FIG. 9 is a perspective view illustrating, in another direction, a state in which a casing of a robot according to an embodiment of the present disclosure is removed.

FIG. 6 is an exploded perspective view of a robot according to an embodiment of the present disclosure. Further, FIG. 7 is a cross-sectional view of interior of a robot according to an embodiment of the present disclosure. Further, FIG. 8 is a perspective view illustrating a state in which a casing of a robot according to an embodiment of the present disclosure is removed. Further, FIG. 9 is a perspective view illustrating, in another direction, a state in which a casing of a robot according to an embodiment of the present disclosure is removed.

The casing 10 may include a front casing 11 and a rear casing 12. The rear casing 12 may be fastened at a rear portion of the front casing 11. The front casing 11 and the rear casing 12 may define the internal space of the casing 10 together.

The casing 10 may be provided with the unit seating part 13 on which the display unit 40 is seated. More specifically, the unit seating part 13 may be depressed rearwardly from a front face of the front casing 11.

The display unit 40 may be seated on a front face of the unit seating part 13.

A link passing hole 14 may be defined in the casing 10. More specifically, the link passing hole 14 may be defined in the unit seating part 13 of the front casing 11 to pass through the unit seating part 13 in a back and forth direction. The link passing hole 14 may include a plurality of link passing holes. The link passing hole 14 may be a hole elongated in a up and down direction.

A link 130 (see FIG. 6) connected to the display unit 40 may pass through the link passing hole 14. More specifically, when the display unit 40 is seated on the unit seating part 13, a link connector 43 (see FIG. 6) of the display unit 40 may be positioned in the link passing hole 14. When the display unit 40 is tilted upward and separated from the unit seating part 13, the link 130 connected to the link connector 43 may pass through the link passing hole 14.

A through-hole 15 in which the sensor device 49 is disposed may be defined in the casing 10. More specifically, the through-hole 15 may be defined in the front face of the front casing 11 so as to pass through the front face of the front casing 11 in a back and forth direction. The through-hole 15 may be positioned below the unit seating part 13.

The base 20 may include a base housing 21 and a base plate 24.

The base housing 21 may form an outer surface of the base 20. A space may be defined in the base housing 21.

A rear face of the base housing 21 may be opened. The base plate 24 may cover the open rear face of the base housing 21.

The base plate 24 may be arranged horizontally. The base plate 24 may be provided with the vehicle 24A and 24B.

The vehicle 24A and 24B may include a driving motor 24A and a driving wheel 24B connected to the driving motor 24A. The driving motor 24A may include a pair of driving motors and the driving wheel 24B may include a pair of driving wheels.

The driving motor 24A may be received in the internal space of the base housing 21. The driving wheel 24B may be rotated via power of the driving motor 24A to drive the robot.

The column 25 may be formed to extend in a up and down direction. Preferably, the column 25 may be erected vertically.

The column 25 may protrude upwardly from the base plate 24. That is, a bottom end of the column 25 may be supported and fixed by the base plate 24.

The column 25 may include a pair of column panels 26 spaced apart from each other in a left and right direction. Each of the column panels 26 may extend vertically.

A tilting motor 27 for tilting the casing 10 relative to the base 20 may be disposed between the pair of column panels 26. That is, the tilting motor 27 may be embedded in the column 25. Thereby, the tilting motor 27 may be safely protected.

Two tilting shaft receiving holes 26A into which the tilting shaft 59 is rotatably inserted may be defined in an upper portion of the column 25. More specifically, the two tilting shaft receiving holes 26A may be respectively defined to pass through upper portions of the pair of column panels 26 in a left and right direction.

The tilting motor 27 may be positioned below the tilting shaft 59. That is, a vertical dimension H1 between the base 20 and the tilting motor 27 may be smaller than a vertical dimension H2 between the base 20 and the tilting shaft 59. Thus, even when an external impact or the like is transmitted to the tilting shaft 59, an impact transmitted to the tilting motor 27 may be relatively small.

A column passing hole 23 through which the column 25 passes may be defined in the base housing 21. The column passing hole 23 may be defined to pass through the base housing 21 in a up and down direction. The column 25 may pass through the column passing hole 23 and enter the casing 10.

An open portion 10A through which the column 25 passes may be defined in a lower portion of the casing 10. The open portion 10A may be defined in a manner to pass through a rear face of the casing 10. The open portion 10A may be defined to be elongated in a back and forth direction. Therefore, the casing 10 may be smoothly tilted relative to the base 20 without interfering with the column 25.

In the base 20, the depression 22 may be defined downwardly in the top face of the base housing 21. The casing 10 may be positioned in the depression 22. The column passing hole 23 may be defined in the depression 22.

The casing 10 may be smoothly tilted in a back and forth direction without interfering with the base 20.

In this connection, the robot according to an embodiment of the present disclosure may include an inner frame 50 tiltably fastened to the column 25.

The inner frame 50 is tiltably connected to the column 25 such that the casing 10 connected to the inner frame 50 may be tilted relative to the base 20 in a back and forth direction. That is, the inner frame 50 may be tilted together with the casing 10 in the back and forth direction.

The inner frame 50 may support components embedded in the casing 10. More specifically, the inner frame 50 may support a rotating motor 91, an ascending and descending motor 101, and a fixing plate 104, which will be described below. The inner frame 50 may also support the sensor device 49.

The inner frame 50 may include a pair of main panels 51 spaced apart from each other in a left and right direction. The pair of main panels 51 may be positioned on opposite sides around the column 25. That is, the column 25 may be positioned between the pair of main panels 51.

The pair of main panels 51 may be arranged in parallel. The pair of main panels 51 may face away from each other.

The inner frame 50 may include a supporter 57 for supporting the fixing plate 104 and a connecting part 56 for connecting the supporter 57 and each of the main panels 51.

The supporter 57 may be fastened to the fixing plate 104. The supporter 57 may support the fixing plate 104 from below. the supporter 57 may be arranged vertically.

The supporter 57 may have a plate shape with both sides thereof respectively facing left and right. The supporter 57 may include a pair of supporters spaced apart from each other in a left and right direction. The pair of supporters may be respectively fastened to left and right edges of the fixing plate 104. An ascending and descending plate 103 to be described below may be positioned between the pair of supporters.

The connecting part 56 may be of a block shape formed to extend in a back and forth direction. The connecting part 56 may be positioned between the supporter 57 and the main panel 51 to connect the supporter 57 and each of the main panels 51.

The connecting part 56 may be fastened to an outer face of a top end of each of the main panels 51. The outer face of each of the main panels 51 may refer to a face among both faces of each of the main panels 51 facing an inner face of the casing 10. Further, the connecting part 56 may be fastened to an inner face of a bottom end of the supporter 57. The inner face of the supporter 57 may refer to a face among both faces of the supporter 57 opposite to the other face facing the inner face of the casing 10.

The inner frame 50 may include a connecting bar 52 connecting the pair of main panels 51.

The connecting bar 52 may be a bar extending in a left and right direction.

The connecting bar 52 may connect front edges of the pair of main panels 51 with each other. More specifically, the connecting bar 52 may connect lower portions of the front edges of the pair of main panels 51 with each other.

The connecting bar 52 may be positioned in front of the column 25.

When the inner frame 50 is tilted rearward relative to the column 25, the connecting bar 52 may be hooked to the column 25. The connecting bar 52 may serve as a limiter that limits an extent to which the inner frame 50 and the casing 10 are tilted rearwardly.

The inner frame 50 may include a motor installation part 58 on which an ascending and descending motor 101 to be described below is installed. The ascending and descending motor 101 may be directly fastened to the motor installation part 58. Alternatively, an ascending and descending motor bracket 101A (see FIG. 9) to which the ascending and descending motor 101 is equipped may be fastened to the motor installation part 58.

The motor installation part 58 may be of a plate shape that is level or inclined. The motor installation part 58 may support the ascending and descending motor 101 from below.

The motor installation part 58 may be fastened to a protrusion 51C protruding rearwardly from each of the main panels 51. More specifically, the protrusion 51C may protrude rearwardly from a rear edge of each of the main panels 51. Further, the motor installation part 58 may be fastened at an upper portion of the protrusion 51C. The protrusion 51C may be formed on an upper portion of the rear edge of each of the main panels 51.

The protrusion 51C may include a pair of protrusions. The motor installation part 58 may connect the pair of protrusions respectively formed on the pair of main panels with each other.

The inner frame 50 may include a rear panel 53 facing in a rear direction.

The rear panel 53 may be fastened at a rear portion of the pair of main panels. The rear panel 53 may connect rear edges of the pair of main panels with each other. The rear panel 53 may be connected to lower portions of the rear edge of the pair of main panels. That is, the rear panel 53 may be positioned below the protrusion 51C.

A length of the rear panel 53 in a left and right direction may be larger than a length between the pair of main panels in a left and right direction.

Various circuit boards necessary for driving the robot may be mounted on a rear face of the rear panel 53.

The inner frame 50 may include one or more reinforcement panels 54 connecting the each of main panels 51 and the rear panel 53.

The reinforcement panels 54 may connect the outer face of each of the main panels 51 to a front face of the rear panel 53. More specifically, some of the plurality of reinforcement panels 54 may connect an outer face of one of the main panels 51 to the front face of the rear panel 53, and the others may connect an outer face of the other the main panel 51 and the front face of the rear panel 53.

The reinforcement panels 54 are preferably connected to each of the main panels 51 and the rear panel 53 at right angles.

The inner frame 50 may support the sensor device 49. More specifically, the sensor device bracket 55 to which the sensor device 49 is equipped may be fastened to the inner frame 50.

The sensor device bracket 55 may be fastened to at least one of the pair of main panels 51.

In this connection, the display unit 40 may include the second display 41, a rear cover 42 for covering the second display 41 from the rear, and a link connector 43 provided on the rear cover 42.

The rear cover 42 may be in contact with the unit seating part 13 of the front casing 11.

The link connector 43 may be provided on a rear face of the rear cover 42. The link connector 43 may be inserted into the link passing hole 14 of the front casing 11. A link 130 to be described below may be connected to the link connector 43.

In this connection, the robot according to an embodiment of the present disclosure may include a tilting mechanism for tilting the head unit 30 and the display unit 40 together. Further, the robot according to an embodiment of the present disclosure may include a rotating mechanism for rotating the head unit 30. The tilting mechanism and the rotating mechanism may be collectively referred to as a driving mechanism.

The tilting mechanism may include the ascending and descending motor 101, the ascending and descending plate 103, the fixing plate 104, a contact bar 105, a first guide body 110 and the link 130.

The ascending and descending motor 101 may be embedded in the casing 10.

The ascending and descending motor 101 may be installed on the motor installation part 58 of the inner frame 50.

The ascending and descending motor 101 may ascend the ascending and descending plate 103.

The ascending and descending plate 103 may be inclined downwards forwardly. However, the present disclosure is not limited thereto, and the ascending and descending plate 103 may be arranged horizontally.

The ascending and descending plate 103 may be positioned on the connecting part 56 of the inner frame 50. The ascending and descending plate 103 may be positioned between the pair of supporters of the inner frame 50.

The fixing plate 104 may be positioned above the ascending and descending plate 103. The fixing plate 104 may be positioned between the head unit 30 and the ascending and descending plate 103.

The fixing plate 104 may be disposed in parallel to the ascending and descending plate 103.

The fixing plate 104 may be fastened to and supported by the supporter 57 of the inner frame 50.

At least one guide bar 106 for guiding an ascend of the ascending and descending plate 103 may be connected to the fixing plate 104. The guide bar 106 may be elongated in a up and down direction. A top end of the guide bar 106 may be fastened to the fixing plate 104. The guide bar 106 may pass through the ascending and descending plate 103 to guide the ascend of the ascending and descending plate 103.

Preferably, the guide bar 106 may include a plurality of guide bars. Some of the plurality of guide bars may be connected to one side of the fixing plate 104, and the others may be connected to the other side of the fixing plate 104.

A bottom end of the guide bar 106 may be connected to a guide bar fixing part 107. The guide bar fixing part 107 may securely fix the guide bar 106 together with the fixing plate 104.

The guide bar fixing part 107 may be elongated in a back and forth direction. The guide bar fixing part 107 may be in a form of a plate formed in parallel with the fixing plate 104.

The guide bar fixing part 107 includes a pair of guide bar fixing parts. One of the pair of guide bar fixing parts is connected to the guide bar 106 connected to one side of the fixing plate 104, the other is connected to the guide bar 106 connected to the other side of the fixing plate 104.

The guide bar fixing part 107 may be positioned under the connecting part 56 of the inner frame 50. The guide bar fixing part 107 may be fastened to a rear face of the connecting part 56. The guide bar fixing part 107 may protrude in a back and forth direction beyond the connecting part 56. The guide bar 106 may be connected to front and rear protruding portions of the connecting part 56 of the guide bar fixing part 107.

It is possible that the guide bar 106 may pass through the connecting part 56 of the inner frame 50 to be connected to the guide bar fixing part 107, or a bottom end of the guide bar 106 may be directly connected to the connecting part 56.

The contact bar 105 may be connected to the head unit 30. More specifically, a top end of the contact bar 105 may be connected to the head unit 30, and a bottom end of the contact bar 105 may maintain in a contact with the ascending and descending plate 103. The contact bar 105 is preferably in line contact with the ascending and descending plate 103.

The contact bar 105 may pass through the fixing plate 104 and the head receiving cover 32 to be connected to the head unit 30. The fixing plate 104 may be provided with an opening 104B defined therein through which the contact bar 105 passes. A through-hole 32A through which the contact bar 105 passes may be defined in the head receiving cover 32.

The contact bar 105 may be bent in a direction in which a height of the contact bar 105 increases forwardly. The contact bar 105 may be bent in a direction approaching a vertical direction upwardly. The contact bar 105 may be arc-shaped. Therefore, when the ascending and descending plate 103 presses the contact bar 105 upwardly, the head unit 30 may be not only tilted upwardly but also ascended.

The first guide body 110 may be positioned above the fixing plate 104. The first guide body 110 may be positioned between the fixing plate 104 and the head receiving cover 32.

The first guide body 110 may have a substantially disk shape.

The first guide body 110 may be fastened to the head receiving cover 21. The first guide body 110 may guide movement of the contact bar 105. The contact bar 105 may pass through the first guide body 110.

The link 130 may connect the ascending and descending plate 103 and the fixing plate 104 to the display unit 40. The link 130 may be connected to the link connector 43 of the display unit 40.

The link 130 may be rotatably connected to a first connector 103A provided on the ascending and descending plate 103. The first connector 103A may be fastened to a rear face of the ascending and descending plate 103. The first connector 103A may be elongated in a back and forth direction. The first connector 103A may protrude forward beyond the ascending and descending plate 103. The link 130 may be rotatably connected to a front end of the first connector 103A.

The link 130 may be rotatably connected to a second connector 104A provided on the fixing plate 104. The second connector 104A may be fastened onto a top face of the fixing plate 104. The second connector 104A may be fastened to a front edge of the fixing plate 104.

In one example, the link 130 may be directly connected to respective front edges of the ascending and descending plate 103 and the fixing plate 104.

When the ascending and descending plate 103 is ascended, a length of the link 130 in a left and right direction may be increased, and the display unit 40 may be moved forward and tilted upwardly. Conversely, when the ascending and descending plate 103 descends, the length of the link 130 in a back and forth direction may be reduced, and the display unit 40 may be moved rearward and tilted downwardly.

In this connection, the rotating mechanism may include the rotating motor 91, a rotating wheel 92, a wire W, the first guide body 110, and a second guide body 120.

The rotating motor 91 may be embedded in the casing 10. The rotating motor 91 may be installed in the inner frame 50. More specifically, a rotating motor bracket 91A on which the rotating motor 91 is mounted may be installed on the inner frame 50.

The rotating motor bracket 91A may be fastened in front of the inner frame 50. The rotating motor bracket 91A may connect the front edges of the pair of main panels 51 to each other. The rotating motor bracket 91A may be positioned above the connecting bar 52.

The rotating motor 91 mounted on the rotating motor bracket 91A may be positioned between the pair of main panels 51. This allows the rotating motor 91 to be safely protected.

The rotating motor 91 may be positioned at a lower height than the ascending and descending motor 101. More specifically, a vertical dimension H3 between the base 20 and the rotating motor 91 may be smaller than a vertical dimension H4 between the base 20 and the ascending and descending motor 101.

The rotating motor 91 may rotate the head unit 30. More specifically, the rotating motor 91 may rotate the first guide body 110. In addition, the head unit 30 and the contact bar 105 may rotate together with the first guide body 110. That is, the first guide body 110 may be rotatably disposed above the fixing plate 104.

The rotating wheel 92 may be connected to the rotating motor 91. The rotating wheel 92 may be positioned in front of the rotating motor bracket 91A.

The wire W may transmit rotational force of the rotating wheel 92 to the first guide body 110. The wire W may form a single closed curve surrounding a portion of outer circumference of the first guide body 110 and a portion of outer circumference of the rotating wheel 92.

The second guide body 120 may guide a rotation of the first guide body 110.

The second guide body 120 may be fixed on the fixing plate 104. The second guide body 120 may have an annular shape surrounding the outer circumference of the first guide body 110. The second guide body 120 may include at least one arc.

A height of the second guide body 120 may be smaller than a height of the first guide body 110. Accordingly, the second guide body 120 may surround bottom outer circumference of the first guide body 110.

When the rotating motor 91 rotates the rotating wheel 92, the rotational force of the rotating wheel 92 may be transmitted to the first guide body 110 by the wire W. The first guide body 110 may be guided inwardly the second guide body 120, and rotates. At this time, the contact bar 105 passing through the first guide body 110 and the head unit 30 connected to the contact bar 105 may rotate together with the first guide body 110.

Further, as described above, the first guide body 110 may be fastened to a rear face of the head receiving cover 32. Thus, the head receiving cover 32 may also rotate with the first guide body 110. However, the present disclosure is not limited thereto. When the head receiving cover 32 is fixed to the casing 10 without being fastened to the first guide body 110, the head receiving cover 32 may not rotate.

Figure 10:
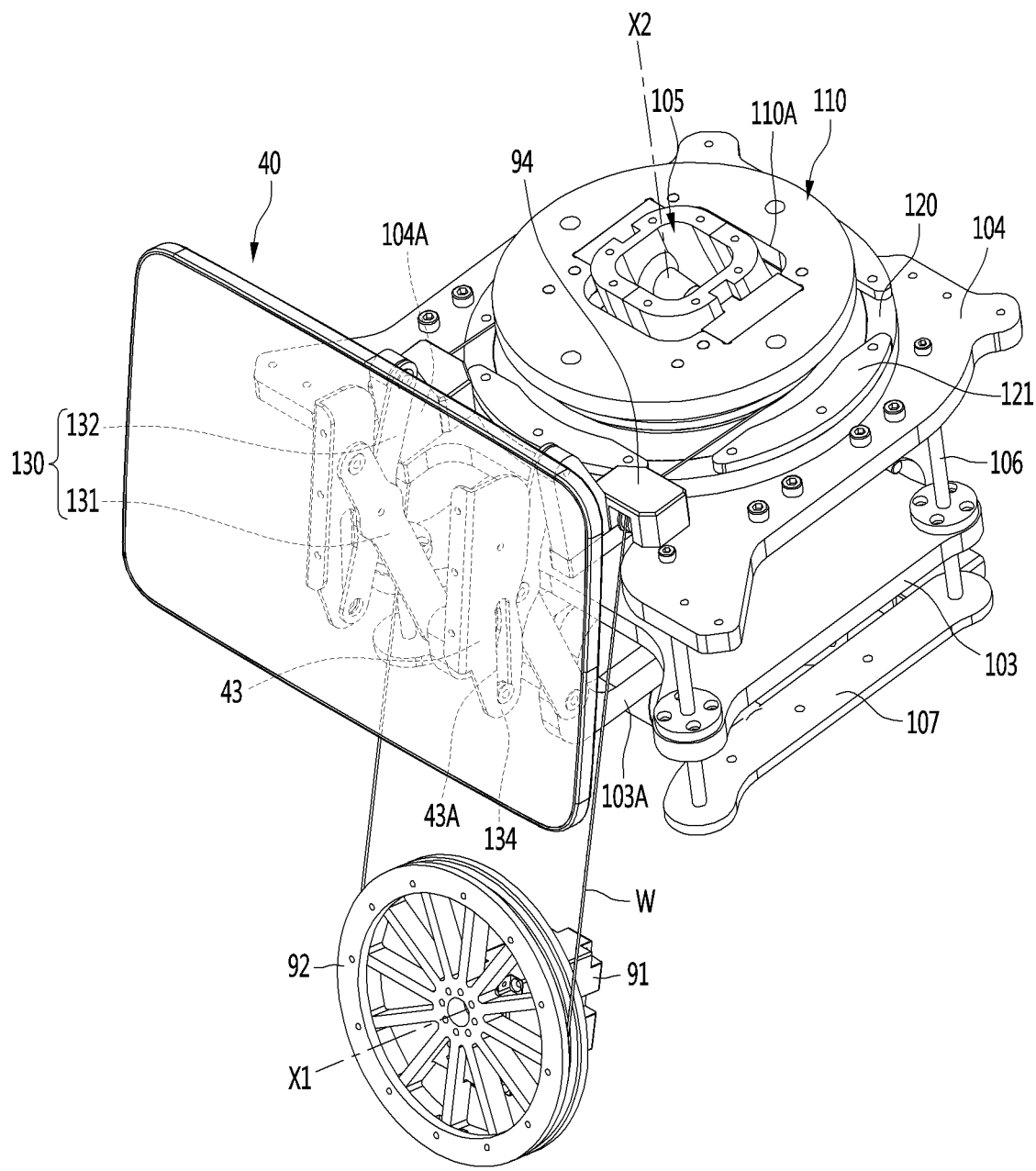
FIG. 10 illustrates a driving mechanism according to an embodiment of the present disclosure.
Figure 11:
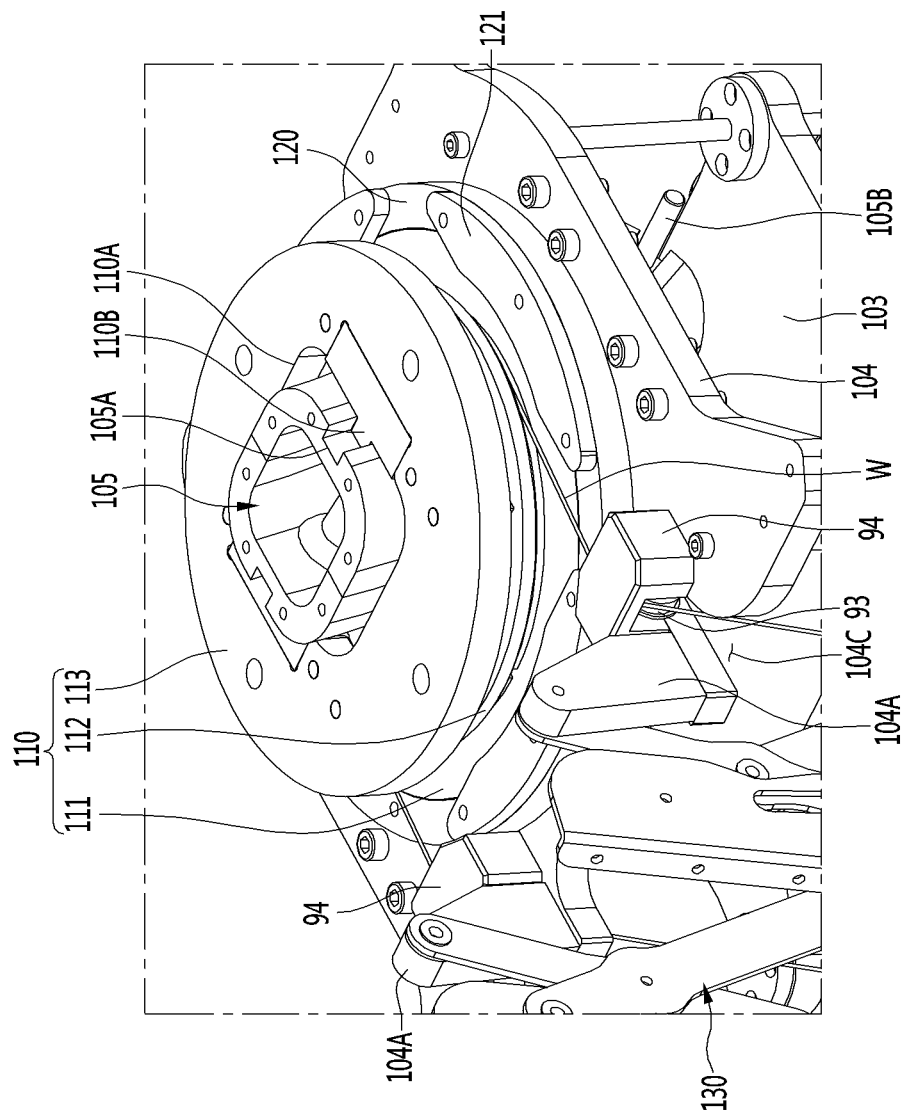
FIG. 11 is an enlarged view of a portion of the driving mechanism illustrated in FIG. 10.
Figure 12:
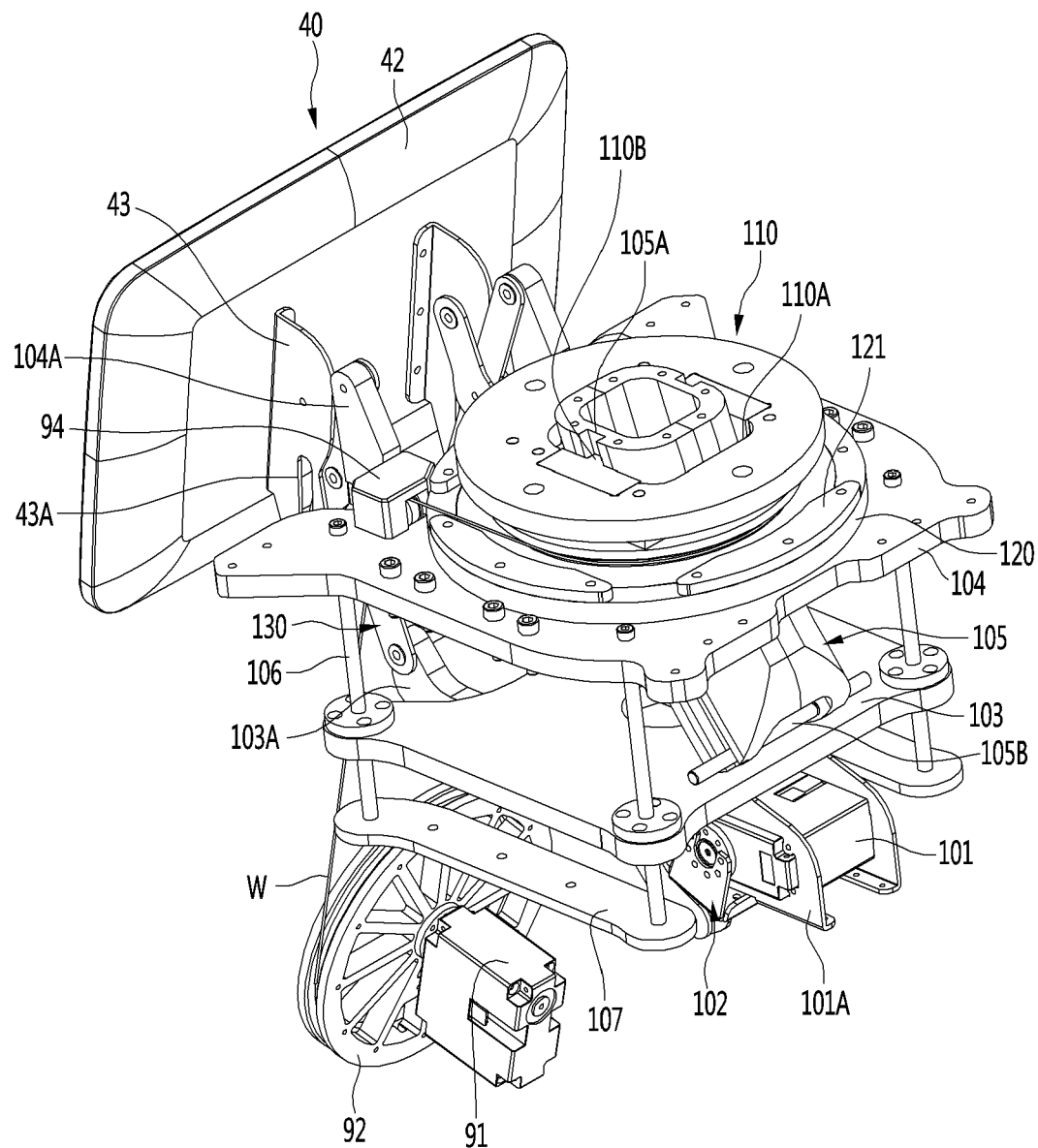
FIG. 12 illustrates the driving mechanism illustrated in FIG. 10 in another direction.
Figure 13:
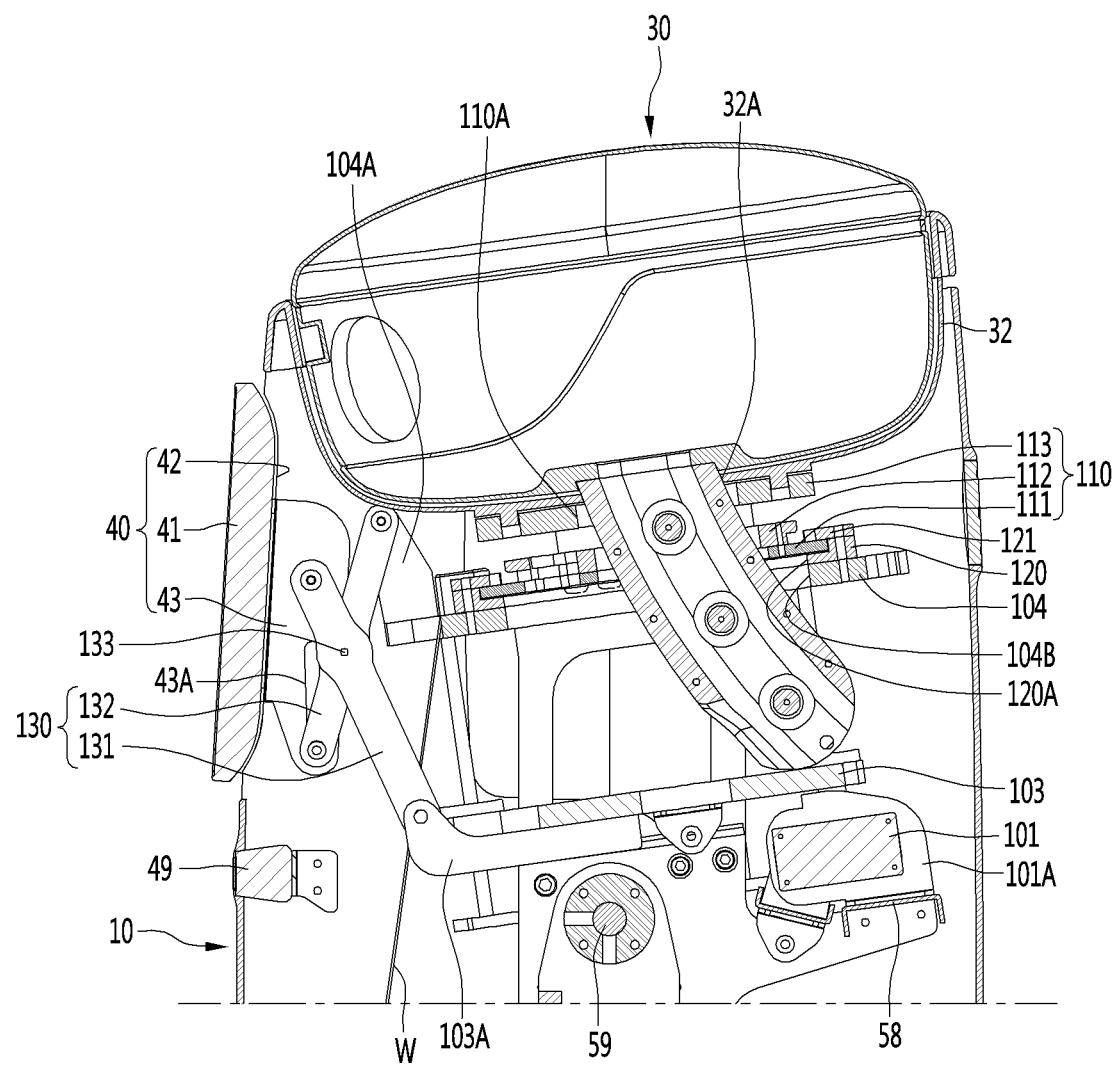
FIG. 13 is a cross-sectional view in which an internal upper portion of a robot according to an embodiment of the present disclosure is enlarged.

FIG. 10 illustrates a driving mechanism according to an embodiment of the present disclosure. FIG. 11 is an enlarged view of a portion of the driving mechanism illustrated in FIG. 10. FIG. 12 illustrates the driving mechanism illustrated in FIG. 10 in another direction. FIG. 13 is a cross-sectional view in which an internal upper portion of a robot according to an embodiment of the present disclosure is enlarged.

The first guide body 110 may include a lower body 111, a middle body 112, and an upper body 113. The lower body 111, the middle body 112, and the upper body 113 may be fastened together and rotated together. Two or more of the lower body 111, the middle body 112, and the upper body 113 may be integrally formed.

The lower body 111 may be in a form of a disk. The lower body 111 may be rotatably disposed above the fixing plate 104.

The lower body 111 may be positioned inside the second guide body 120. That is, the second guide body 120 may surround outer circumference of the lower body 111.

The middle body 112 may be in a form of a disk. The middle body 112 may be fastened to a top face of the lower body 111. The middle body 112 may be positioned between the lower body 111 and the upper body 113.

The wire W may be wound around a portion of the outer circumference of the middle body 112. The wire W may rotate the middle body 112 without slipping relative to the middle body 112. In one example, the wire W may have at least one latching portion (e.g., a knot), the outer circumference of the middle body 112 may be formed with a latching groove for receiving the latching portion.

A diameter of the middle body 112 may be smaller than a diameter of the lower body 111 and the upper body 113. Therefore, the wire W may not be separated upward or downward.

The upper body 113 may be in a form of a disk. the upper body 113 may be positioned on the upper side of the middle body 112. The upper body 113 may be fastened to the head receiving cover 32.

The lower body 111, the middle body 112, and the upper body 113 may be provided with a through-hole 110A defined therein through which the contact bar 105 passes.

The first guide body 110 may be provided with a guide rib 110B to be inserted in a guide groove 105A defined in the contact bar 105. Preferably, the guide groove 105A may include a pair of guide grooves defined in both sides of the contact bar 105.

The elongated guide groove 105A may be defined in the contact bar 105 and extend in a length direction of the contact bar 105. That is, the guide groove 105A may be defined elongated in a direction toward forward upwardly.

More specifically, a guide block may be fastened to the upper body 113, and the guide rib 110B may be formed on the guide block. The guide block may be fastened to a top face of the middle body 112.

However, the present disclosure is not limited thereto. In addition, the guide rib 110B may be formed to protrude inwardly from at least one through-hole 110A of the lower body 111, the middle body 112, and the upper body 113

A stopper 105B may be provided at the bottom end of the contact bar 105. The stopper 105B may be stopped by a rear face of the fixing plate 104 when the ascending and descending plate 103 is ascended to a certain height.

The stopper 105B may be in a pin shape elongated in a left and right direction. The stopper 105B may have a length that does not pass through the opening 104B defined in the fixing plate 104.

The opening hole 104B defined in the fixing plate 104 may be larger than the through-hole 110A defined in the first guide body 110. An inner circumference of the opening 104B may be spaced apart from the contact bar 105.

This is because the contact bar 105 rotating together with the first guide body 110 is formed to be bent, so that a turning radius of the contact bar 105 increases downwardly.

Likewise, an inner diameter of the second guide body 120 may also be larger than an inner diameter of the through-hole 110A defined in the first guide body 110. The inner diameter of the second guide body 120 may be equal to or similar to the inner diameter of the opening 104B defined in the fixing plate 104.

Thus, the contact bar 105 may easily rotate without interfering with the fixing plate 104 and the second guide body 120.

In this connection, the second guide body 120 may be provided with a deviation preventing part 121 for preventing the first guide body 110 from deviating.

The deviation preventing part 121 may be fastened to the top face of the second guide body 120. The deviation preventing part 121 may be roughly arc shaped, but is not limited thereto.

The deviation preventing part 121 may include a plurality of deviation preventing parts. The plurality of deviation preventing parts may be spaced apart from each other in a circumferential direction of the second guide body 120. The wire W may pass between adjacent deviation preventing parts.

The deviation preventing part 121 may protrude inwardly from the second guide body 120. A portion of the deviation preventing part 121 may be positioned on the lower body 111. Thereby, the lower body 111 may be constrained in a up and down direction.

In this connection, the fixing plate 104 may be provided with a wire supporting wheel 93 and a wheel supporter 94.

The wire supporting wheel 93 may support the wire W in contact with the wire W. The wire supporting wheel 93 may rotate about a rotation axis formed in a left and right direction.

The wheel supporter 94 may rotatably support the wire supporting wheel 93. The wheel supporter 94 may be provided on the top face of the fixing plate 104. The wheel supporter 94 may be provided on a front portion of the fixing plate 104.

The wire W may pass through an inner portion of the wheel supporter 94 while in contact with the wire supporting wheel 93.

The wheel supporter 94 may include a pair of supporting parts for supporting the rotation axis of the wire supporting wheel 93 on both sides and a connecting part for connecting upper portions of the pair of supporting parts to each other. The wire W may pass between the pair of supporting parts. The connecting part may prevent the wire W from deviating upwardly from the wheel supporter 94 when a tension applied to the wire W is weak.

The fixing plate 104 may have an interference-avoiding groove 104C defined therein through which the wire W passes. The interference-avoiding groove 104C may be defined by a front edge of the fixing plate 104 being depressed rearwardly. The wheel supporter 94 may be positioned above the interference-avoiding groove 104C. This allows the wire W to be in contact with the wire supporting wheel 93 without interfering with the fixing plate 104.

The wire W may be supported by the wire supporting wheel 93, and changed in direction.

More specifically, a portion of the wire W between the rotating wheel 92 and the wire supporting wheel 93 may be steeper than a portion between the wire supporting wheel 93 and the first guide body 110.

A virtual rotation axis X1 of the rotating wheel 91 and a virtual rotation axis X2 of the first guide body 110 may not be parallel to each other. More specifically, the virtual rotation axis X1 of the rotating wheel 91 may be tilted to be closer to a horizontal line than to a vertical line, and the virtual rotation axis X2 of the first guide body 110 may be tilted to be closer to a vertical line than to a horizontal line.

Accordingly, the wire W is supported by the wire supporting wheel 93 and is changed in direction such that the rotational force of the rotating wheel 91 may be easily transmitted to the first guide body 110.

The first guide body 110 and the virtual rotational axis X2 of the head unit 30 may be perpendicular to both faces of the ascending and descending plate 103. When the ascending and descending plate 103 is oriented to be tilted, the first guide body 110 and the virtual rotational axis X2 of the head unit 30 may also be inclined without being vertical. Therefore, the rotation operation of the head unit 30 may become natural.

The wire supporting wheel 93 may include a pair of wire supporting wheels. In addition, the wheel supporter 94 may include a pair of wheel supporters.

One of the wire supporting wheels may support a portion of the rotating wheel 92 that faces the first guide body 110. The other of the wire supporting wheels may support a portion of the first guide body 110 that faces the rotating wheel 92.

In this connection, the link 130 may connect the ascending and descending plate 103 and the fixing plate 104 to the display unit 40.

The link 130 may include a plurality of links. In one example, the link 130 may include a pair of links spaced apart from each other in a left and right direction. In this case, the display unit 40 may include the link connector 43. In addition, the link connector 43 may include a pair of link connectors. Further, the ascending and descending plate 103 may include the first connector 103A. In addition, the first connector 103A may include a pair of first connectors. Further, the fixing plate 104 may include the second connector 104A. In addition, the second connector 104A may include a pair of second connectors.

The link 130 may include at least one pair of link bars 131 and 132 that intersect with each other. Hereinafter, a case in which the link 130 includes a pair of link bars 131 and 132 will be described as an example.

The link 130 may include a first link bar 131 and a second link bar 132. The first link bar 131 and the second link bar 132 may intersect each other to form a joint 133.

The first link bar 131 may be rotatably connected to the link connector 43 of the display unit 40. Further, the first link bar 131 may be rotatably connected to the first connector 103A provided on the ascending and descending plate 103. That is, a front end of the first link bar 131 may be rotatably connected to the link connector 43, and a rear end of the first link bar 131 may be rotatably connected to the first connector 103A.

The second link bar 132 may be movably connected along an elongate hole 43A defined in the link connector 43 of the display unit 40. Further, the second link bar 132 may be rotatably connected to the second connector 104A provided on the fixing plate 104. That is, a front end of the second link bar 132 may be movably connected along the elongate hole 43A defined in the link connector 43, and the rear end of the second link bar 132 may be rotatably connected to the second connector 104A.

The elongate hole 43A may be defined to pass through the link connector 43 in a left and right direction. The elongate hole 43A may be elongated in a up and down direction. The elongate hole 43A may be defined below a portion to which the first link bar 131 is connected in the link connector 43.

A projection 134 to be inserted into the elongate hole 43A may be formed at the front end of the second link bar 132. The projection 134 may protrude from a face that faces the link connector 43 among both faces of the second link bar 132 in a direction perpendicular to the face. The projection 134 may move between both ends of the elongate hole 43A while being inserted in the elongate hole 43A.

Thus, when the ascending and descending plate 103 is ascended, the display unit 40 may be moved forward as well as tilted upward.

In this connection, the power of the ascending and descending motor 101 may be transmitted to the ascending and descending plate 103 via a power transmitting part 102. The power transmitting part 102 may convert the rotational force of the ascending and descending motor 101 into a force acting in an ascending and descending direction of the ascending and descending plate.

Figure 14A:
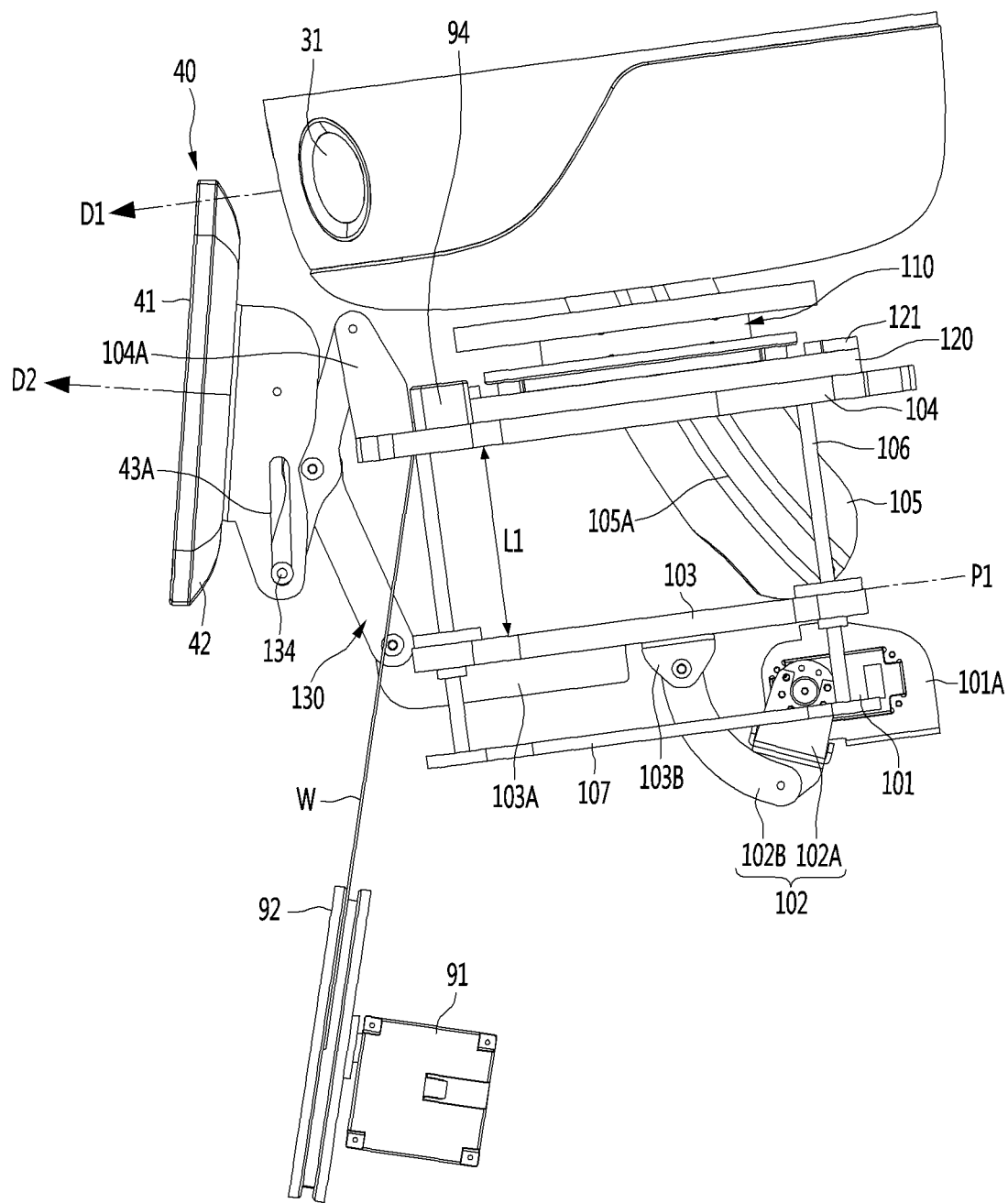
FIGS. 14A and 14B are side views for illustrating a tilting process of a head unit and a display unit according to an embodiment of the present disclosure.
Figure 14B:
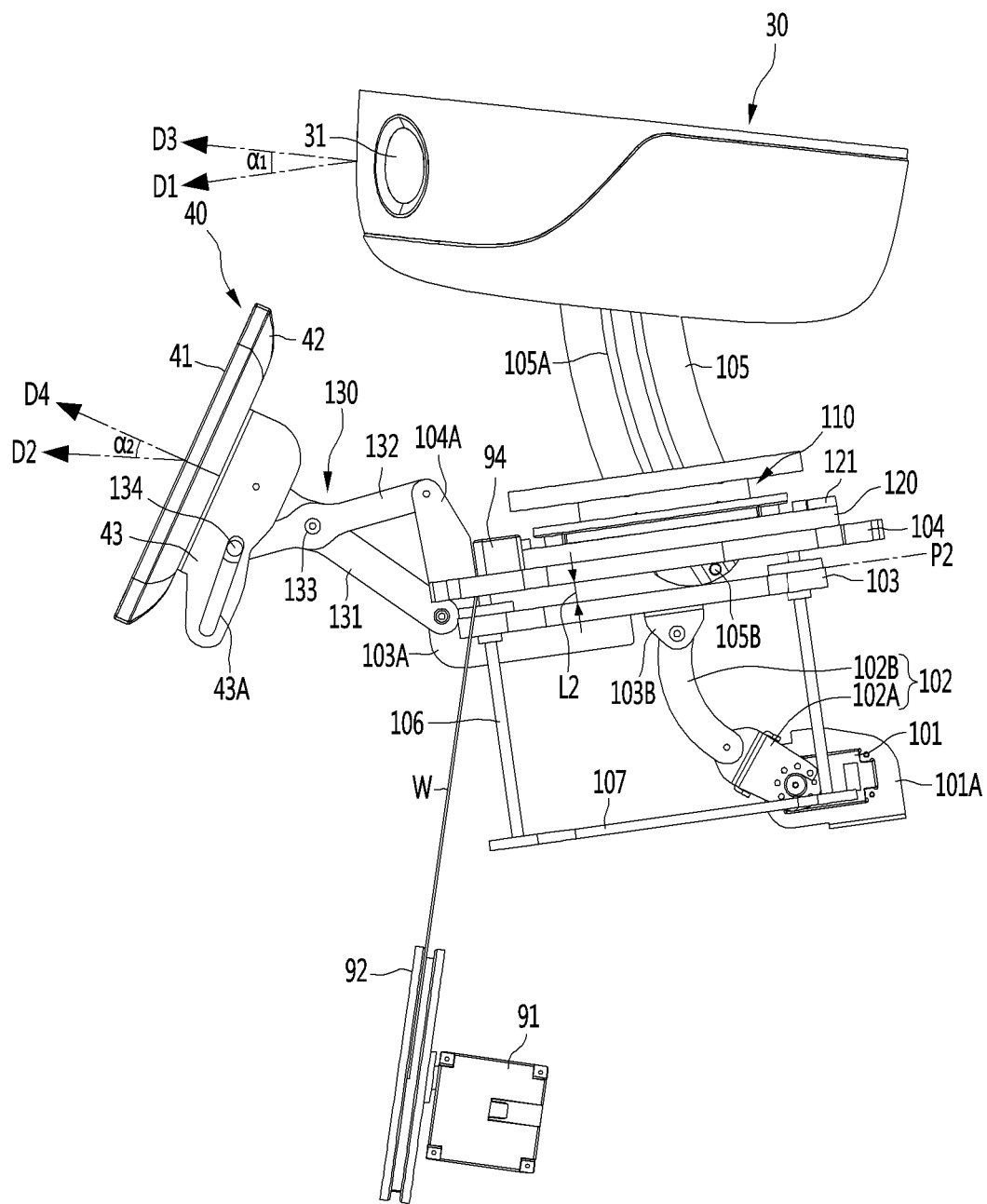

The power transmitting part 102 may include a first arm 102A (see FIGS. 14A and 14B) and a second arm 102B (see FIGS. 14A and 14B). The first arm 102A may be connected to the ascending and descending motor 101. The second arm 102B may be rotatably connected to the first arm 102A, and rotatably connected below the ascending and descending plate 103.

More specifically, one end of the first arm 102A may be connected to a rotation axis of the ascending and descending motor 101 and the other end thereof may be rotatably connected to the second arm 102B.

The second arm 102B may be formed to be bent in a direction in which a height increases forwardly. The second arm 102B may be bent in a direction approaching a vertical direction forwardly.

One end of the second arm 102B may be rotatably connected to the first arm and the other end thereof may be rotatably connected to an arm connector 103B (see FIGS. 14A and 14B) provided on the ascending and descending plate 103. The arm connector 103B may be fastened to a rear face of the ascending and descending plate 103.

FIGS. 14A and 14B are side views for illustrating a tilting process of a head unit and a display unit according to an embodiment of the present disclosure.

The ascending and descending plate 103 may be ascended from a first position P1 to a second position P2 higher than the first position P1. A distance L1 between the ascending and descending plate 103 and the fixing plate 104 when the ascending and descending plate 103 is positioned in the first position P1 may be larger than a distance L2 between the ascending and descending plate 103 and the fixing plate 104 when the ascending and descending plate 103 is positioned in the second position P2.

When the ascending and descending plate 103 is in the first position P1, the first display 31 of the head unit 30 may be hidden in the casing 10 and the display unit 40 may be in contact with or adjacent to the outer face of the casing 10.

When the ascending and descending plate 103 is in the second position P2, the first display 31 of the head unit 30 may protrude upwardly from the casing 10 and the display unit 40 may be spaced forwardly from the casing 10.

When the ascending and descending plate 103 is ascended from the first position P1 to the second position P2, the first display 31 and the second display 41 may be tilted upward, respectively.

That is, when the ascending and descending plate 103 is ascended, the head unit 30 may be moved upward and tilted upward, simultaneously, and the display unit 40 may be moved forward and tilted upward, simultaneously. Conversely, when the ascending and descending plate 103 descends, the head unit 30 may be moved downward and tilted downward, simultaneously, and the display unit 40 may be moved backward and tilted downward, simultaneously.

Further, when the ascending and descending plate 103 is ascended from the first position P1 to the second position P2, a variable amount of angle a1 in a facing direction of the first display 31 may be different from a variable amount of angle a2 in a facing direction of the second display 41.

More specifically, when the ascending and descending plate 130 is positioned in the first position P1, the first display 31 may be directed in a first direction D1, and the second display 41 may be directed in a second direction D2. When the ascending and descending plate 130 is positioned in the second position P2, the first display 31 may be directed in a third direction D3, and the second display 41 may be directed in a fourth direction D4. The third direction D3 may be a direction tilted upward from the first direction D1, and the fourth direction D4 may be a direction tilted upward from the second direction D2. In this case, the angle a1 defined by the third direction D3 and the first direction D1 may be different from the angle a2 defined by the fourth direction D4 and the second direction D2.

Hereinafter, operations of the driving mechanism will be described.

When the ascending and descending motor 101 rotates in one direction, the power transmitting part 102 may push the ascending and descending plate 103 upward. The ascending and descending plate 103 may be guided by the guide bar 106 and ascended.

The ascending and descending plate 103 may be ascended and may push the contact bar 105 upward. The contact bar 105 may be guided by the first guide body 110 and may be moved upward. At this time, the bottom end of the contact bar 105 may be slid forward while maintaining contact with the top face of the ascending and descending plate 103.

The guide bar 105 and the guide groove 105A defined in the contact bar 105 are formed and defined to be bent such that the head unit 30 connected to the top end of the contact bar 105 may be moved upward and may be tilted upward, simultaneously.

Further, when the ascending and descending plate 103 is ascended, the first connector 103A may also be ascended. Thus, an inclination of the first link bar 131 may become more gentle while rotating relative to the first connector 103A and the link connector 43. That is, a length of the first link bar 131 in a back and forth direction may be increased.

The second link bar 132 intersects the first link bar 131 and forms the joint 133. Therefore, an inclination of the second link bar 132 may become more gentle while rotating relative to the second connector 104A and the link connector 103. That is, a length of the second link bar 132 in a back and forth direction may be increased.

At this time, the projection of the second link bar 132 may move from a bottom end of the elongate hole 43A to a top end of the elongate hole 43A. Accordingly, the display unit 40 may be moved forward and tilted upward, simultaneously.

On the other hand, when the ascending and descending motor 101 rotates in the other direction, the power transmitting part 102 may pull the ascending and descending plate 103 downward. The ascending and descending plate 103 may be guided by the guide bar 106 and may descend.

When the ascending and descending plate 103 descends, the contact bar 105 may be descended by load of the head unit 30 and self-load of the contact bar 105. The contact bar 105 may be guided by the first guide body 110 and may move downward. At this time, the bottom end of the contact bar 105 may be slid rearward while maintaining contact with the top face of the ascending and descending plate 103.

The guide bar 105 and the guide groove 105A defined in the contact bar 105 are formed and defined to be bent such that the head unit 30 connected to the top end of the contact bar 105 moves downward and may be tilted downward, simultaneously.

Further, when the ascending and descending plate 103 descends, the first connector 103A may also descends. Thus, the inclination of the first link bar 131 may become steeper while rotating relative to the first connector 103A and the link connector 43. That is, the length of the first link bar 131 in the back and forth direction may be decreased. The second link bar 132 intersects the first link bar 131 and forms the joint 133. Therefore, the inclination of the second link bar 132 may become steeper while rotating relative to the second connector 104A and the link connector 103. That is, the length of the second link bar 132 in the back and forth direction may be decreased.

At this time, the projection of the second link bar 132 may move from the top end to the bottom end of the elongate hole 43A. Accordingly, the display unit 40 may be moved backward and tilted downward, simultaneously.

Thus, using the single ascending and descending motor 101, not only may the head unit 30 and the display unit 40 be simultaneously tilted upwardly and downwardly, but also degrees to which the head unit 30 and the display unit 40 are tilted be adjusted to be different from each other.

Figure 15A:
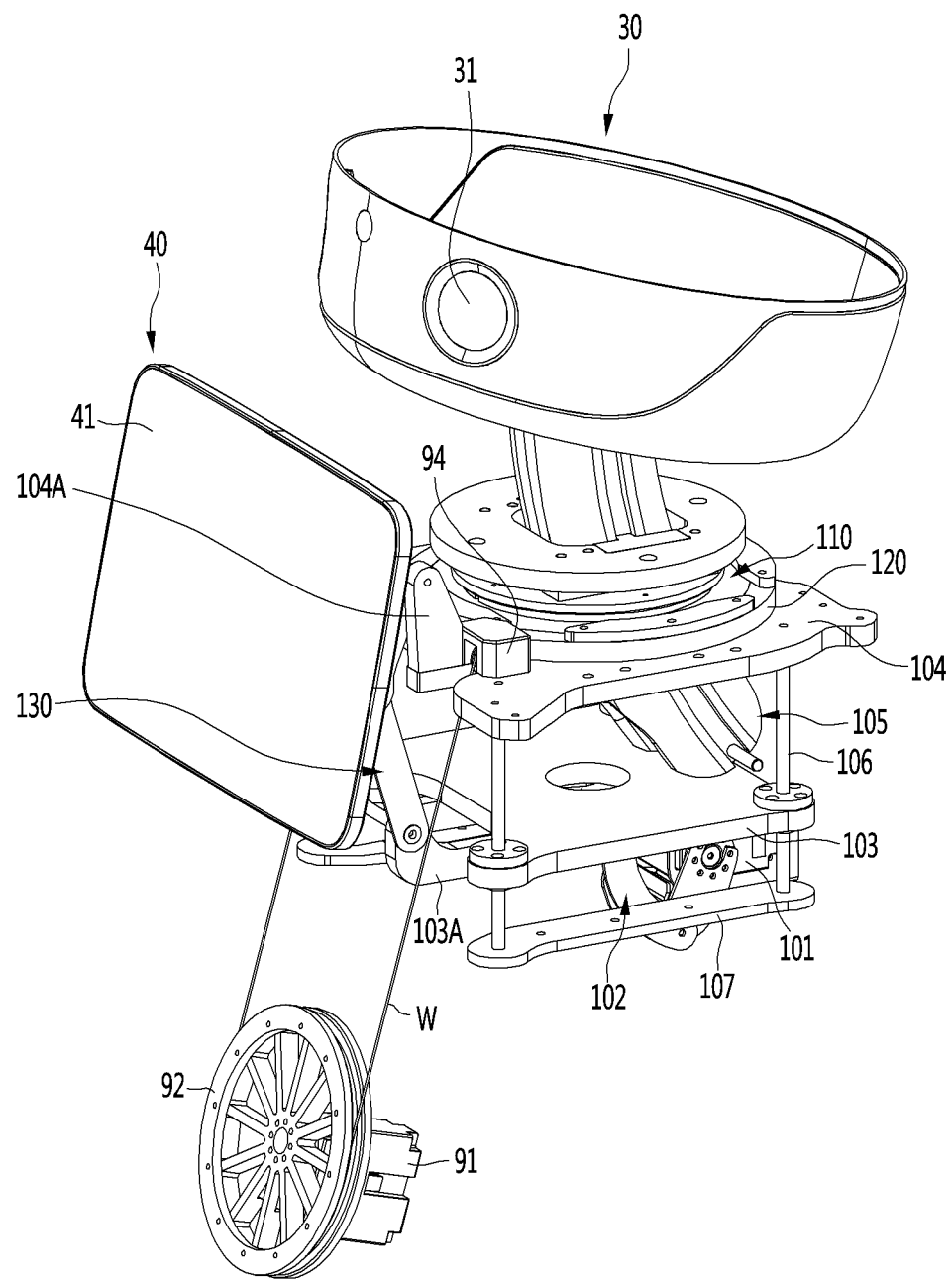
FIGS. 15A and 15B illustrate a rotation process of a head unit according to the embodiment of the present disclosure.
Figure 15B:
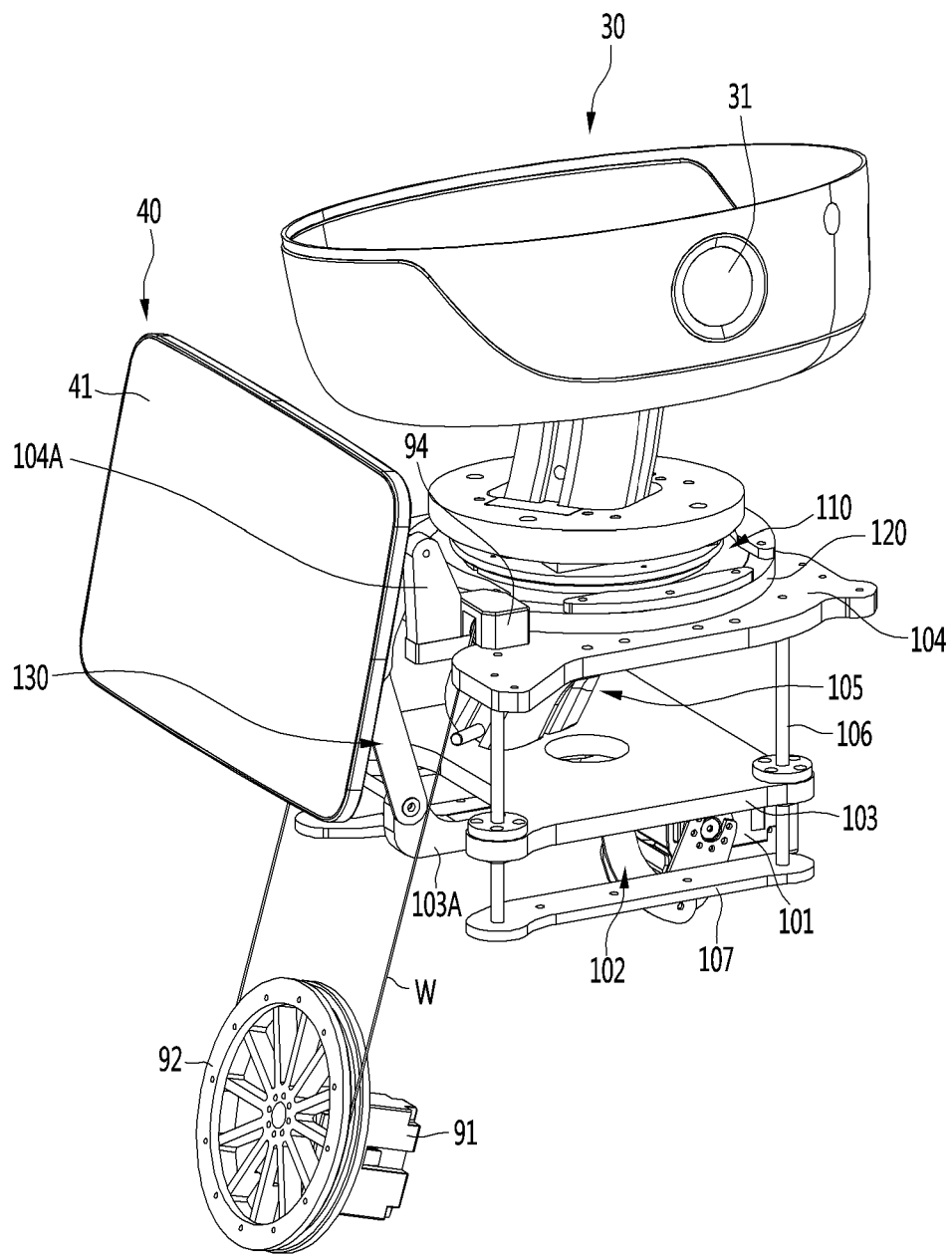

FIGS. 15A and 15B illustrate a rotation process of a head unit according to the embodiment of the present disclosure.

Hereinafter, operations of the rotating mechanism will be described.

When the rotating motor 91 rotates the rotating wheel 92 in one direction, the wire W may transmit the rotational force of the rotating wheel 92 to the first guide body 110, and the first guide body 110 may rotate in a clockwise direction simultaneously with the rotating wheel 92. The first guide body 110 may be guided by the second guide body 120 and rotated.

The wire W is supported by the wire supporting wheel 93 inside the wheel supporter 94 and is held taut. Therefore, the rotational force of the rotating wheel 92 may be smoothly transmitted to the first guide body 110.

The contact bar 105 may rotate with the first guide body 110. At this time, the bottom end of the contact bar 105 may be slid while maintaining contact with the top face of the ascending and descending plate 103. The contact bar 105 is formed to be bent. Therefore, the head unit 30 connected to the top end of the contact bar 105 maintains a tilted state and may rotate in the clockwise direction.

When the rotating motor 91 rotates the rotating wheel 92 in the other direction, the wire W may transmit the rotational force of the rotating wheel 92 to the first guide body 110, and the first guide body 110 may rotate in a counterclockwise direction simultaneously with the rotating wheel 92.

The contact bar 105 may rotate with the first guide body 110. At this time, the bottom end of the contact bar 105 may be slid while maintaining contact with the top face of the ascending and descending plate 103. The contact bar 105 is formed to be bent. Therefore, the head unit 30 connected to the top end of the contact bar 105 may rotate in the counterclockwise direction while maintaining a tilted state.

Thus, the rotating motor 91 may rotate only the head unit 30 and do not rotate the display unit 40. In addition, the rotating motor 91 may rotate the head unit 31 irrespective of the degree of tilting of the head unit 30. Further, the bottom end of the contact bar 105 is rotated while maintaining a state of being in contact with the top face of the ascending and descending plate 103. Therefore, the head unit 30 may rotate while maintaining the tilted state.

Further, the rotating wheel 92 and the first guide body 110 are connected by the wire W. Therefore, there is an advantage that the virtual rotation axis X1 (see FIG. 10) of the rotating wheel 92 and the virtual rotation axis X2 of the first guide body 110 do not have to be aligned with each other. Therefore, a space in the casing 10 may be efficiently utilized. Thus, the robot may become compact.

Figure 16:
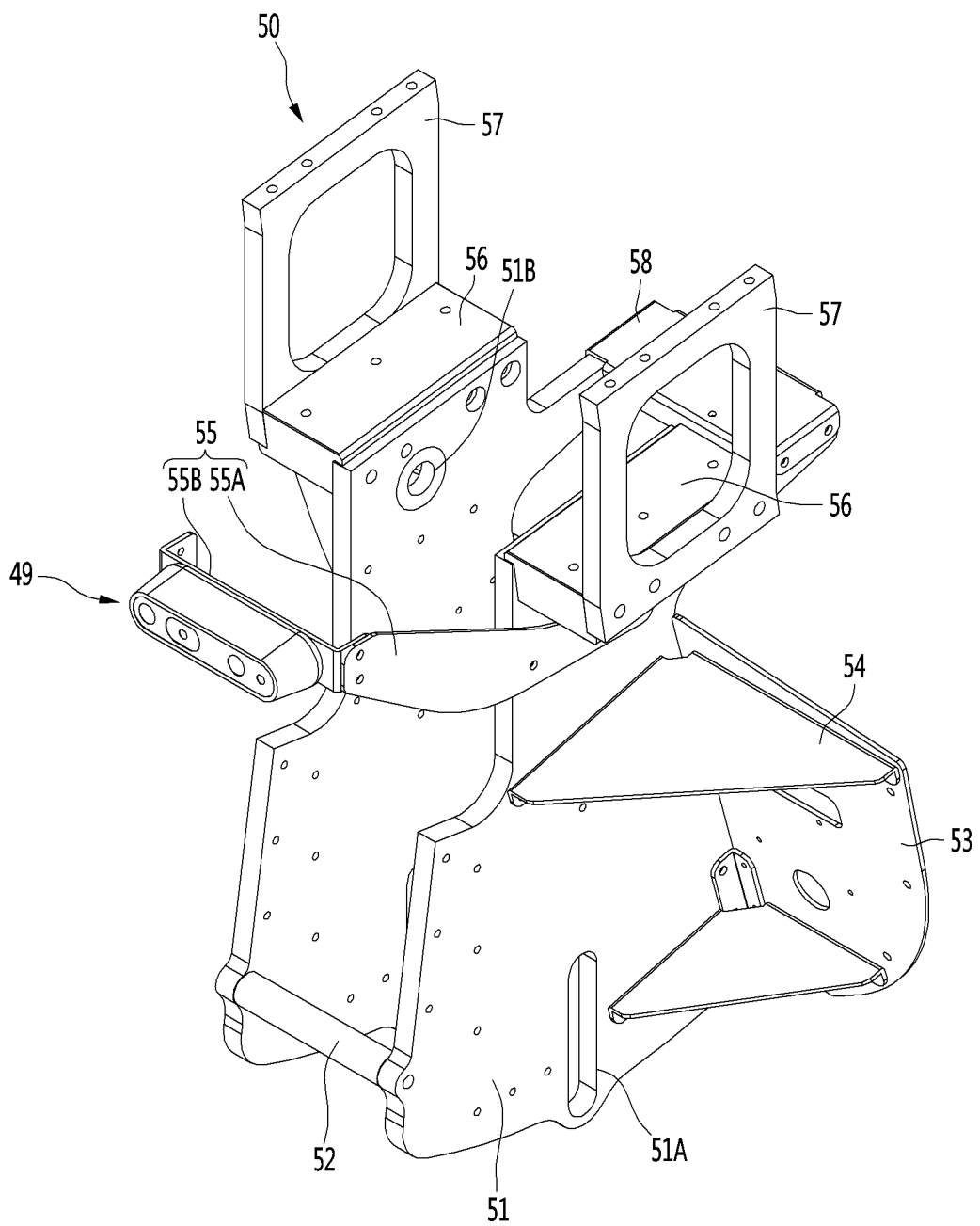
FIG. 16 is a perspective view of an inner frame according to an embodiment of the present disclosure.
Figure 17:
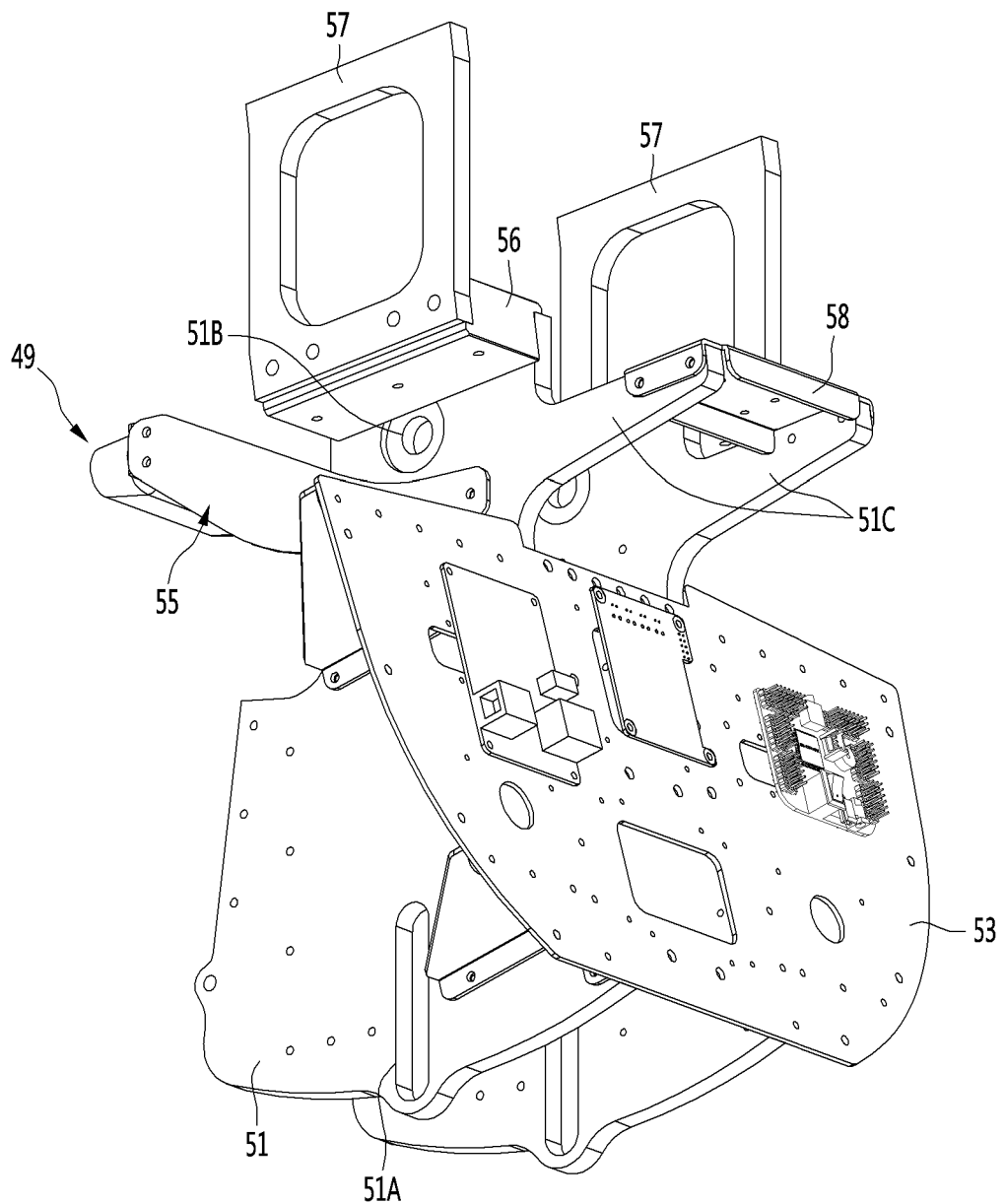
FIG. 17 illustrates the inner frame illustrated in FIG. 16 in another direction.
Figure 18:
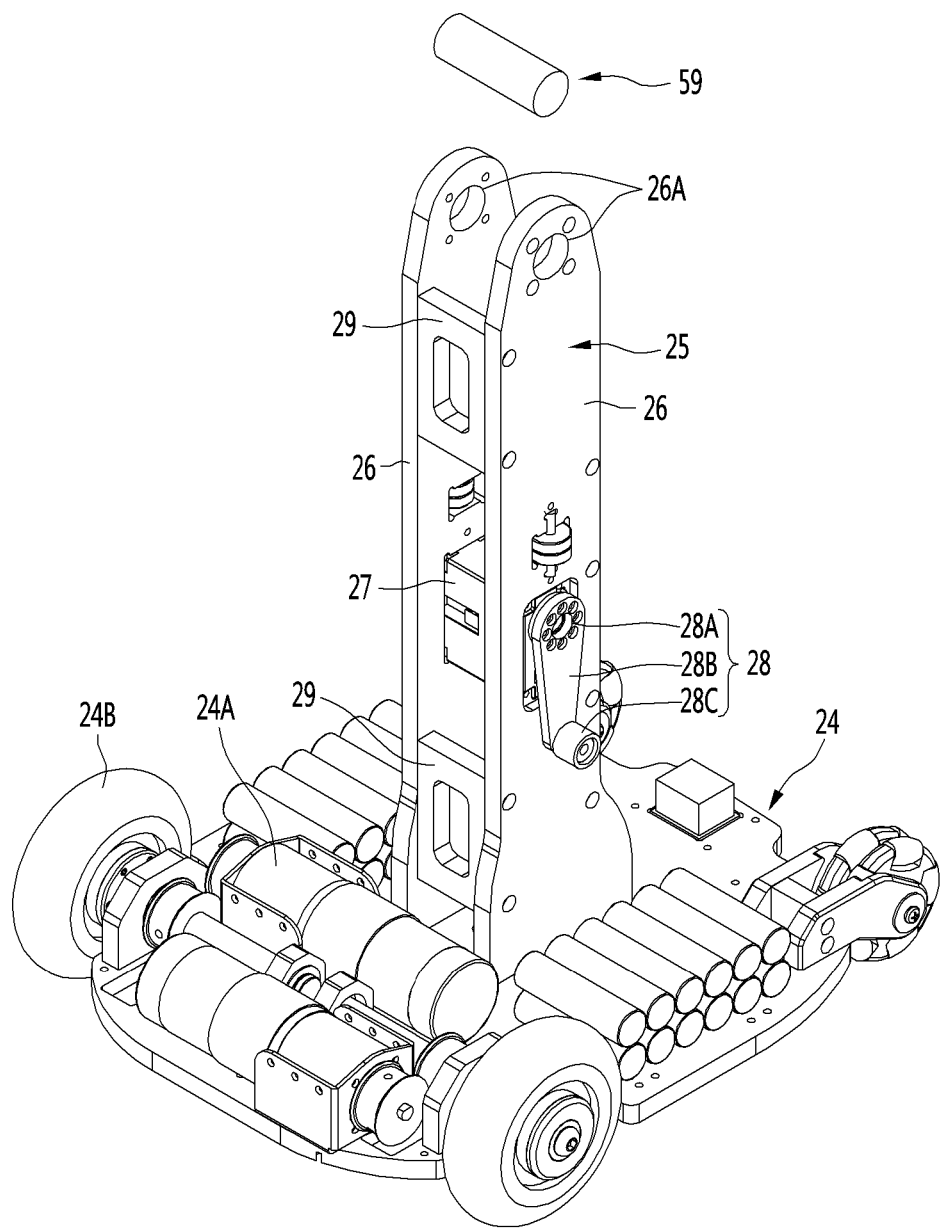
FIG. 18 illustrates a base plate and a column according to an embodiment of the present disclosure.
Figure 19:
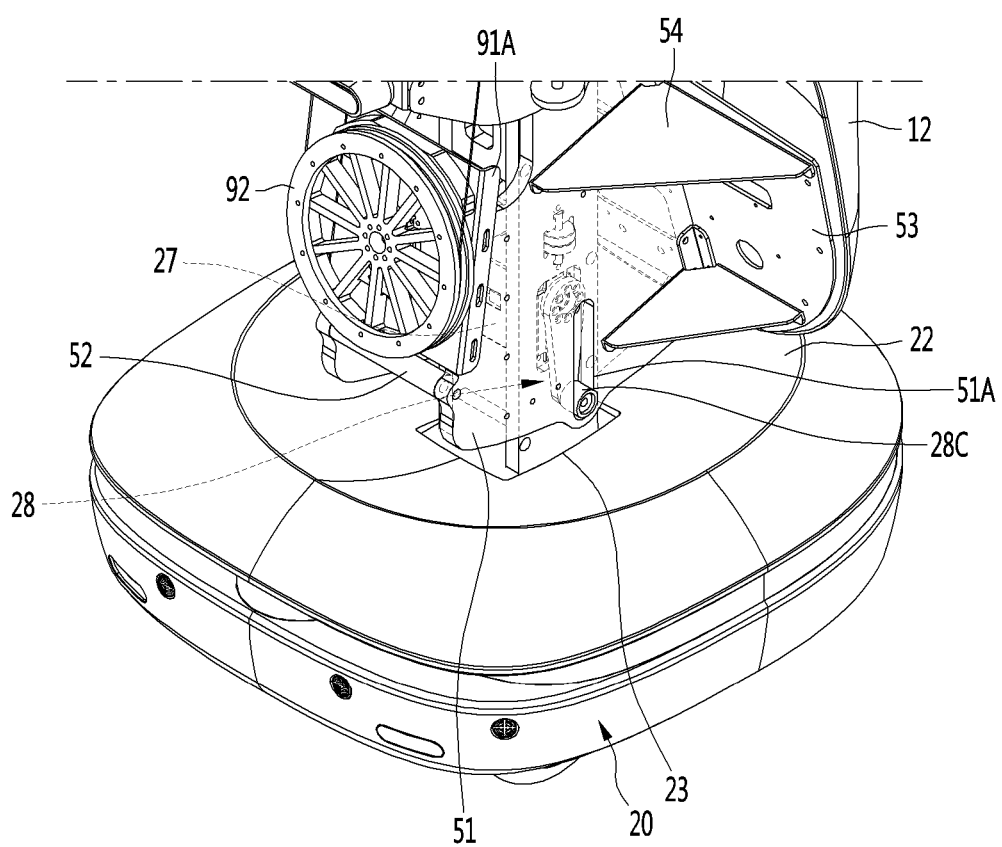
FIG. 19 illustrates a process in which a casing according to an embodiment of the present disclosure is tilted relative to a base.

FIG. 16 is a perspective view of an inner frame according to an embodiment of the present disclosure. Further, FIG. 17 illustrates the inner frame illustrated in FIG. 16 in another direction. Further, FIG. 18 illustrates a base plate and a column according to an embodiment of the present disclosure. Further, FIG. 19 illustrates a process in which a casing according to an embodiment of the present disclosure is tilted relative to a base.

The sensor device bracket 55 to which the sensor device 49 is equipped may be fastened to the inner frame 50. The sensor device bracket 55 may be fastened to at least one of the pair of main panels 51.

The sensor device bracket 55 may include a connecting arm 55A connected to the inner frame 50 and a fastening part 55B connected to the connecting arm 55A and on which the sensor device 49 is equipped.

The connecting arm 55A may be elongated in a back and forth direction. The connecting arm 55A may separate the fastening part 55B and the sensor device 49 from the inner frame 50. The fastening part 55B may be orthogonal to the connecting arm 55A. The sensor device 49 may be fastened to a front face of the fastening part 55B.

In this connection, the column 25 may include at least one inner connector 29 for connecting the pair of column panels 26 to each other. The inner connector 29 may be positioned between the pair of column panels 26. Thereby, a structure of the column 25 may become more rigid.

At least a portion of the column 25 may be positioned within the inner frame 50. More specifically, the column 25 may be positioned between the pair of main panels 51 in the left and right direction, and positioned between the connecting bar 52 and the rear panel 53 in the back and forth direction. Further, the column 25 may be positioned between the rotating motor bracket 91A and the rear panel 53 in the back and forth direction.

The inner frame 50 may have a through-hole 51B defined therein through which the tilting shaft 59 is inserted. More specifically, the through-hole 51B may be defined to pass through upper portions of respective main panels 51 in a left and right direction.

The tilting shaft 59 may pass through the through-hole 51B defined in the inner frame 50 and the tilting shaft receiving hole 26A defined in the column 25 to be inserted. Thereby, the inner frame 50 may be tilted back and forth relative to the column 25.

The inner frame 50 may be positioned above the depression 22 of the base 20. The inner frame 50 may be spaced above the depression 22.

A guide elongate hole 51A may be defined in the inner frame 50. More specifically, the guide elongate hole 51A may include a pair of guide elongated holes defined in at least one of the pair of main panels 51. The guide elongate hole 51A may be defined through a lower portion of each of the main panel 51 to pass through in a left and right direction. The guide elongate hole 51A may extend in a up and down direction.

A lever 28 may be connected to the tilting motor 27. The lever 28 may transmit the rotational force of the tilting motor 27 to the inner frame 50 to tilt the inner frame 50.

The lever 28 has a predetermined radius of rotation, therefore, there is an advantage that an output required of the tilting motor 27 to tilt the inner frame may be relatively reduced.

The lever 28 may include a motor connecting part 28A, a lever body 28B, and a protrusion 28C.

The motor connecting part 28A may be connected to the tilting motor 27.

The lever body 28B may be formed to extend in a direction perpendicular to the rotation axis of the tilting motor 27 from the motor connecting part 28A. More specifically, the rotation axis of the tilting motor 27 may extend in a left and right direction, and the lever body 28B may be formed to extend in a up and down direction.

The protrusion 28C may protrude from the lever body 28B in a direction parallel to the rotation axis of the tilting motor 27. The protrusion 28C may be movably inserted into the guide elongate hole 51A defined in the inner frame 50.

Hereinafter, operations of the tilting motor 27 will be described.

When the tilting motor 27 rotates the lever 28 in one direction while the casing 10 is not tilted relative to the base 20, the protrusion 28C of the lever 28 may move from a bottom end of the guide elongate hole 51A to a top end of the elongate hole, and the inner frame 50 may be tilted forward about the tilting shaft 59.

The inner frame 50 is connected to the casing 10 such that the casing 10 and the head unit 30 and the display unit 40 mounted thereto may be tilted forward together with the inner frame 50.

When the tilting motor 27 rotates the lever 28 in the other direction while the casing 10 is not tilted relative to the base 20, the protrusion 28C of the lever 28 may move from the bottom end of the guide elongate hole 51A to the top end of the elongate hole, and the inner frame 50 may be tilted rearward about the tilting shaft 59. Thus, the casing 10 and the head unit 30 and the display unit 40 mounted thereto may be tilted rear ward together with the inner frame.

Hereinabove, although the present disclosure has been described with reference to exemplary embodiments, the present disclosure is not limited thereto, but may be variously modified and altered by those skilled in the art to which the present disclosure pertains without departing from the spirit and scope of the present disclosure.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

According to a preferred embodiment of the present disclosure, since the head unit having the first display and the display unit having the second display can be tilted, there is an advantage in that it is possible to adjust the inclination of the display in accordance with the height of the user's eyes.

Further, since it is possible to simultaneously tilt the head unit and the display unit using a single motor, there is an advantage in that the structure of the robot is simplified and the costs are reduced.

Further, since the contact bar is formed to be bent and the lower end is in contact with the ascending and descending body, the head unit can tilt upward simultaneous with ascending and the display unit can tilt upward simultaneous with moving forward. Accordingly, the operations of the head unit and the display unit can be more natural.

Further, the first display of the head unit can be hidden in the casing or can protrude over the casing, depending on the degree of tilting. Accordingly, a user can intuitionally recognize the operation mode of the robot.

Further, the inclination change amount in the direction that the head unit faces and the inclination change amount in the direction that the display unit faces may be different from each other. Accordingly, the degrees of tilting of the head unit and the display unit can be differently adjusted.

Further, the power transmission part can convert the rotational force of the ascending and descending motor into force in the ascending and descending direction of the ascending and descending motor plate.

Further, the ascending and descending plate can be guided to ascend and descend by the guide bar. Accordingly, reliability of the tilting operations of the head unit and the display unit can be improved.

Further, foreign substances, etc. can be prevented from permeating between the head unit and the casing by the head receiving cover.

Further, a link-through hole can be formed through the casing. Accordingly, tilting of the display unit positioned outside the casing can be smoothly made by the link.

Further, the second link bar of the link can be connected to be able to move along the oblong hole formed in the link connector of the display unit. Accordingly, the display unit can tilt up and down simultaneously with moving forward and rearward.

Further, the first guide body can guide movement of the contact bar. Accordingly, the contact bar having a bent shape can be easily vertically moved.

Further, a guide rib that is fitted in the guide groove formed on the contact bar can be formed on the first guide body. According, the first guide body can easily guide ascending and descending of the contact bar.

Further, the casing can be tilted forward and rearward with respect to the base. Accordingly, various operations according to driving of the robot can be implemented.

Further, the tilting motor can be spaced downward apart from the tilting shaft. Accordingly, even if external shock, etc. are transmitted to the tilting shaft, the shock that is transmitted to the tilting motor can be relatively decreased.

Further, the lever connected to the tilting motor can tilt the inner frame. Accordingly, output that is required for the tilting motor can be decreased.

Further, a depression can be formed on the top surface of the base. Accordingly, the casing can smoothly tilt forward and rearward without interference with the base.

Further, the fixing plate can be connected to and supported by the inner frame. Accordingly, the tilting mechanism and the rotational mechanism of the robot can be supported in the casing.

What is claimed is:

1. A robot comprising:
a casing that has an internal space;
a head unit that protrudes upward from the casing and has a first display;
a display unit that is disposed ahead of the casing and has a second display;
an ascending and descending motor that is disposed in the casing;
an ascending and descending plate that ascends and descends between a first position and a second position higher than the first position by power of the ascending and descending motor;
a contact bar that has an upper end connected to the head unit and a lower end being in contact with the ascending and descending plate;
a fixing plate that is positioned between the ascending and descending plate and the head unit and has an opening through which the contact bar passes; and
a link that connects the ascending and descending plate and the fixing plate to the display unit.

2. The robot of claim 1, wherein the contact bar is formed to increase in height in a forward direction and to bend so that a forward section is approximately vertical.

3. The robot of claim 1, wherein when the ascending and descending plate is at the first position, the first display is hidden in the casing, and when the ascending and descending plate is at the second position, the first display protrudes upward from the casing.

4. The robot of claim 1, wherein when the ascending and descending plate is at the first position, the display unit is in contact with an outer surface of the casing, and when the ascending and descending plate ascends to the second position, the display unit is spaced apart from the outer surface of the casing.

5. The robot of claim 1, wherein when the ascending and descending plate ascends, the direction that the first display faces and the direction that the second display faces are tilted upward.

6. The robot of claim 5, wherein when the ascending and descending plate ascends from the first position to the second position, an angular change amount of the direction that the first display faces is different from an angular change amount of the direction that the second display faces.

7. The robot of claim 1, further comprising a power transmitting part that transmits rotational force of the ascending and descending motor to the ascending and descending plate,
wherein the power transmitting part includes:
a first arm that is connected to the ascending and descending motor; and
a second arm that is rotatably connected to the first arm and is rotatably connected to a lower side of the ascending and descending plate.

8. The robot of claim 1, further comprising at least one guide bar that is vertically elongated, is connected to the fixing plate, and guides ascending and descending of the ascending and descending plate.

9. The robot of claim 1, further comprising a head receiving cover that is disposed over the fixing plate, has a through-hole through which the contact bar passes, and receives at least a portion of the head.

10. The robot of claim 1, wherein a link-through hole through which the link passes is formed through the casing.

11. The robot of claim 1, wherein the link includes:
a first link bar that is rotatably connected to a first connector disposed on the ascending and descending plate; and
a second link bar that is rotatably connected to a second connector disposed on the fixing plate and forms a joint while crossing the first link bar.

12. The robot of claim 1, wherein the display unit includes:
a rear cover that covers the second display from behind; and
a link connector that is fastened to a rear surface of the rear cover and to which the link is connected.

13. The robot of claim 12, wherein the link includes:
a first link bar that is rotatably connected to the link connector; and
a second link bar that forms a joint while crossing the first link bar and is connected to be movable along an oblong hole formed in the link connector.

14. The robot of claim 1, further comprising a guide body that is fastened to an upper side of the fixing plate and guides movement of the contact bar.

15. The robot of claim 14, wherein a guide groove that is elongated in a longitudinal direction of the contact bar is formed at the contact bar, and a guide rib that is fitted in the guide groove is formed at the guide body.

16. The robot of claim 1, further comprising:
a base that is disposed under the casing;
a column that protrudes upward into the casing from the base;
an inner frame that is fastened to the column to be able to tilt; and
a tilting motor that tilts the inner frame with respect to the column,
wherein the casing and the inner frame are tilted together with respect to the base.

17. The robot of claim 16, wherein a tilting axis of the inner frame is spaced apart from an upper side of the tilting motor.

18. The robot of claim 16, further comprising a lever that transmits rotational force of the tilting motor to the inner frame,
wherein the lever includes:
a motor connecting part that is connected to the tilting motor;
a lever body that extends from the motor connecting part in a direction perpendicular to a rotational axis of the tilting motor; and
an oblong hole inserting part that protrudes from the lever body in a direction parallel to the rotational axis of the tilting motor and is movably inserted a guide oblong hole formed in the inner frame.

19. The robot of claim 16, wherein a depression is formed to be recessed downward on a top surface of the base, and the casing is positioned over the depression.

20. The robot of claim 16, wherein the fixing plate and the ascending and descending motor are connected to and supported by the inner frame.

* * * * *